US012659009B2

(12) United States Patent　　　　(10) Patent No.:　US 12,659,009 B2
Cheema et al.　　　　　　　　　　　(45) Date of Patent:　Jun. 16, 2026

(54) JOINT BEAM AND BANDWIDTH PART SWITCHING

(71) Applicant: Lenovo (Singapore) Pte. Ltd., New Tech Park (SG)

(72) Inventors: Sher Ali Cheema, Ilmenau (DE); Ankit Bhamri, Rödermark (DE); Ali Ramadan Ali, Kraiburg am Inn (DE); Majid Ghanbarinejad, Chicago, IL (US); Seyedomid Taghizadeh Motlagh, Oberursel (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 106 days.

(21) Appl. No.: 18/547,488

(22) PCT Filed: Feb. 22, 2022

(86) PCT No.: PCT/IB2022/051561
§ 371 (c)(1),
(2) Date: Aug. 22, 2023

(87) PCT Pub. No.: WO2022/175926
PCT Pub. Date: Aug. 25, 2022

(65) Prior Publication Data
US 2024/0137098 A1　　Apr. 25, 2024
US 2024/0235651 A9　　Jul. 11, 2024

Related U.S. Application Data

(60) Provisional application No. 63/152,314, filed on Feb. 22, 2021.

(51) Int. Cl.
*H04B 7/06*　　　(2006.01)
*H04B 7/08*　　　(2006.01)

(52) U.S. Cl.
CPC ....... *H04B 7/0696* (2023.05); *H04B 7/06952* (2023.05); *H04B 7/0874* (2013.01)

(58) Field of Classification Search
CPC .. H04B 7/0696; H04B 7/0874; H04B 7/0695; H04B 7/088; H04B 7/2041; H04L 5/001;
(Continued)

(56) References Cited

U.S. PATENT DOCUMENTS 11,700,050 B2 *　7/2023　Ma ...................... H04W 72/046
　　　　　　　　　　　　　　　　　　375/262
2020/0145169 A1 *　5/2020　Zhou ..................... H04W 80/02
(Continued)

FOREIGN PATENT DOCUMENTS

WO　　2019195528 A1　10/2019

OTHER PUBLICATIONS

R1-2009736 "Summary #3 of 8.4.4 Other Aspects of NR-NTN Document for: Discussion and Decision", 3GPP TSG RAN WG1 Meeting #103e, Oct. 26-Nov. 13, 2020, pp. 1-47.*
PCT/IB2022/051561, "International Search Report and the Written Opinion of the International Searching Authority, or the Declaration", International Searching Authority, Jun. 2, 2022, pp. 1-15.
Xiaomi, "Discussion on beam management for NTN", 3GPP TSG RAN WG1 #102 R1-2006605, Aug. 17-29, 2020, pp. 1-4.
(Continued)

*Primary Examiner* — Sophia Vlahos

(74) *Attorney, Agent, or Firm* — Kunzler Needham Hilton

(57) ABSTRACT

Apparatuses, methods, and systems are disclosed for bandwidth part ("BWP") and beam switching. One apparatus includes a transceiver and a processor that receives a first configuration, where the first configuration contains a mapping between a set of beams and a set of BWPs in a cell. The processor jointly triggers beam and BWP switching based on a switching indication and according to the first configuration. The processor then communicates, via the transceiver, with a radio access network ("RAN") using a new beam and a new BWP in response to the beam and BWP switching.

20 Claims, 13 Drawing Sheets

(58) Field of Classification Search
CPC .. H04L 5/0098; H04W 72/046; H04W 24/10;
H04W 48/12; H04W 72/231; H04W
72/232
See application file for complete search history.

(56) References Cited

U.S. PATENT DOCUMENTS

| | | | | |
|---|---|---|---|---|
| 2020/0274678 A1* | 8/2020 | Lin | H04L 5/0092 | |
| 2020/0313729 A1* | 10/2020 | Zhou | H04W 24/10 | |
| 2021/0105716 A1* | 4/2021 | Wu | H04L 41/0806 | |
| 2021/0159966 A1* | 5/2021 | Xi | H04L 5/0023 | |
| 2022/0006600 A1* | 1/2022 | Ma | H04L 5/0051 | |
| 2022/0007346 A1* | 1/2022 | Ma | H04W 72/046 | |
| 2022/0038168 A1* | 2/2022 | Ma | H04L 1/203 | |
| 2022/0038169 A1* | 2/2022 | Ma | H04W 24/08 | |
| 2022/0225421 A1* | 7/2022 | Miao | H04B 7/0695 | |
| 2022/0248406 A1* | 8/2022 | Zhang | H04W 72/53 | |
| 2022/0338230 A1* | 10/2022 | Yu | H04L 5/0053 | |
| 2023/0217458 A1* | 7/2023 | Bang | H04W 48/12 | 370/329 |
| 2023/0232391 A1* | 7/2023 | Zhou | H04L 5/0091 | 370/329 |
| 2023/0291533 A1* | 9/2023 | Zhou | H04L 5/0098 | |
| 2023/0396403 A1* | 12/2023 | Xu | H04L 5/0091 | |
| 2023/0396984 A1* | 12/2023 | Shrivastava | H04W 76/27 | |
| 2023/0403592 A1* | 12/2023 | Shokri Razaghi | H04B 7/0645 | |
| 2024/0039625 A1* | 2/2024 | Medles | H04B 7/1851 | |

OTHER PUBLICATIONS

3GPP, "3rd Generation Partnership Project; Technical Specification Group Radio Access Network; Solutions for NR to support non-terrestrial networks (NTN) (Release 16)", 3GPP TR 38.821 V16.0.0, Dec. 2019, pp. 1-140.

3GPP "3rd Generation Partnership Project; Technical Specification Group Radio Access Network; NR; Physical channels and modulation (Release 16)", 3GPP TS 38.211 V16.4.0, Dec. 2020, pp. 1-133.

3GPP, "3rd Generation Partnership Project; Technical Specification Group Radio Access Network; NR; Multiplexing and channel coding (Release 16)", 3GPP TS 38.212 V16.4.0, Dec. 2020, pp. 1-152.

3GPP, "3rd Generation Partnership Project; Technical Specification Group Radio Access Network; NR; Physical layer procedures for control (Release 16)", 3GPP TS 38.213 V16.4.0, Dec. 2020, pp. 1-181.

3GPP, "3rd Generation Partnership Project; Technical Specification Group Radio Access Network; NR; Physical layer procedures for data (Release 16)", 3GPP TS 38.214 V16.4.0, Dec. 2020, pp. 1-169.

3GPP, "3rd Generation Partnership Project; Technical Specification Group Radio Access Network; NR; Medium Access Control (MAC) protocol specification (Release 16)", 3GPP TS 38.321 V16.3.0, Dec. 2020, pp. 1-156.

* cited by examiner

Satellite Beam to Cell mapping

Satellite Beam to Cell mapping

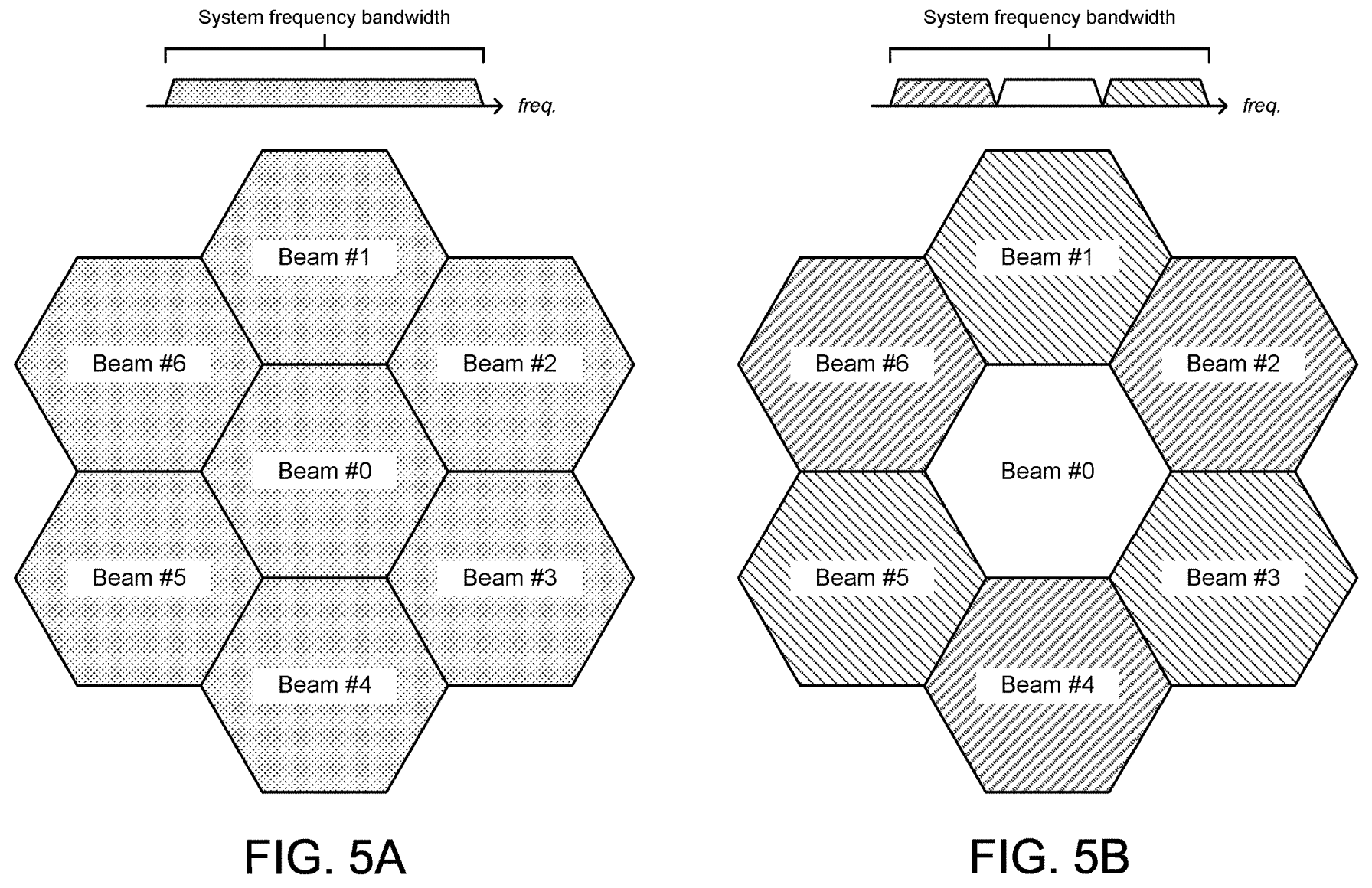

Beam #2  Beam #3

Beam #1  Beam #0  Beam #4

Beam #6  Beam #5

System frequency bandwidth freq.

FIG. 5B

Beam #2  Beam #3

Beam #1  Beam #0  Beam #4

Beam #6  Beam #5

System frequency bandwidth freq.

```
-- ASN1START
-- TAG-SERVING-CELL-CONFIG-START

ServingCellConfig ::=                   SEQUENCE {
    tdd-UL-DL-ConfigurationDedicated        TDD-UL-DL-ConfigDedicated           OPTIONAL,   -- Cond TDD initialDownlinkBWP                      BWP-DownlinkDedicated               OPTIONAL,   -- Need M
    downlinkBWP-ToReleaseList               SEQUENCE (SIZE (1..maxNrofBWPs)) OF BWP-Id      OPTIONAL,   -- Need N
    downlinkBWP-ToAddModList                SEQUENCE (SIZE (1..maxNrofBWPs)) OF BWP-Downlink OPTIONAL,   -- Need N
    firstActiveDownlinkBWP-Id               BWP-Id                              OPTIONAL,   -- Cond SyncAndCellAdd
    bwp-InactivityTimer                     ENUMERATED  {ms2, ms3, ms4, ms5, ms6, ms8, ms10, ms20, ms30, ms40,
                                                         ms50, ms60, ms80, ms100, ms200,ms300, ms500, ms750
                                                         ms1280, ms1920, ms2560, spare10, spare9, spare8,
                                                         spare7, spare6, spare5, spare4, spare3, spare2,
                                                         spare1 }                           OPTIONAL,   -- Need R
    ┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─┐
    │  DownlinkBWPswitchSequence-Id            SEQUENCE (BWP-Id1, BWP-Id2, BW-Id3, BW-Id4)    OPTIONAL,   -- Need N │
    │  bwp-activityTimer                       ENUMERATED {ms2, ms3, ms4, ms5}                OPTIONAL,   -- Need R │
    └─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─┘
    defaultDownlinkBWP-Id                   BWP-Id                              OPTIONAL,   -- Need S uplinkConfig                            UplinkConfig                        OPTIONAL,   -- Need M
    supplementaryUplink                     UplinkConfig                        OPTIONAL,   -- Need M pdcch-ServingCellConfig                 SetupRelease { PDCCH-ServingCellConfig }  OPTIONAL,   -- Need M
    pdsch-ServingCellConfig                 SetupRelease { PDSCH-ServingCellConfig }  OPTIONAL,   -- Need M
    csi-MeasConfig                          SetupRelease { CSI-MeasConfig }     OPTIONAL,   -- Need M
    sCellDeactivationTimer                  ENUMERATED  {ms20, ms40, ms80, ms160, ms200, ms240, ms320, ms400,
                                                         ms480, ms520, ms640, ms720, ms840, ms1280, spare2, spare1}
                                                                                OPTIONAL,   -- Cond ServingCellWithoutPUCCH
    crossCarrierSchedulingConfig            CrossCarrierSchedulingConfig        OPTIONAL,   -- Need M
    tag-Id                                  TAG-Id,
    ue-BeamLockFunction                     ENUMERATED {enabled}                OPTIONAL,   -- Need R
    pathlossReferenceLinking                ENUMERATED {pCell, sCell}           OPTIONAL,   -- Cond SCellOnly
    servingCellMO                           MeasObjectId                        OPTIONAL,   -- Cond MeasObject
    ...
```

```
-- ASN1START
-- TAG-SERVING-CELL-CONFIG-START

ServingCellConfig ::=          SEQUENCE {
    tdd-UL-DL-ConfigurationDedicated        TDD-UL-DL-ConfigDedicated        OPTIONAL,    -- Cond TDD initialDownlinkBWP                      BWP-DownlinkDedicated                            OPTIONAL,    -- Need M
    downlinkBWP-ToReleaseList               SEQUENCE (SIZE (1..maxNrofBWPs)) OF BWP-Id       OPTIONAL,    -- Need N
    downlinkBWP-ToAddModList                SEQUENCE (SIZE (1..maxNrofBWPs)) OF BWP-Downlink OPTIONAL,    -- Need N
    firstActiveDownlinkBWP-Id               BWP-Id                                           OPTIONAL,    -- Cond SyncAndCellAdd
    bwp-InactivityTimer                     ENUMERATED ( ms2, ms3, ms4, ms5, ms6, ms8, ms10, ms20, ms30, ms40, ms50,
                                                        ms60, ms80,ms100, ms200,ms300, ms500, ms750, ms1280, ms1920,
                                                        ms2560, spare10, spare9, spare8, spare7, spare6, spare5,
                                                        spare4, spare3, spare2, spare1 )                 OPTIONAL,    -- Need R DownlinkBWPswitchSequence-Id            SEQUENCE (SIZE (1.. maxNrofBWP-Switch)) OF BWP-Timer OPTIONAL,  -- Need N defaultDownlinkBWP-Id                   BWP-Id                                           OPTIONAL,    -- Need S uplinkConfig                            UplinkConfig                                     OPTIONAL,    -- Need M
    supplementaryUplink                     UplinkConfig                                     OPTIONAL,    -- Need M pdcch-ServingCellConfig                 SetupRelease { PDCCH-ServingCellConfig }         OPTIONAL,    -- Need M
    pdsch-ServingCellConfig                 SetupRelease { PDSCH-ServingCellConfig }         OPTIONAL,    -- Need M
    csi-MeasConfig                          SetupRelease { CSI-MeasConfig }                  OPTIONAL,    -- Need M
    sCellDeactivationTimer                  ENUMERATED ( ms20, ms40, ms80, ms160, ms200, ms240, ms320, ms400, ms520,
                                                        ms640, ms720, ms840, ms1280, spare2, spare1 )
                                                                                             OPTIONAL,    -- Cond ServingCellWithoutPUCCH
    crossCarrierSchedulingConfig            CrossCarrierSchedulingConfig                     OPTIONAL,    -- Need M
    ...
}

BWP-Timer ::=                  SEQUENCE {
    Bwp-Id                     BWP-Id
    bwp-activityTimer          INTEGER (1.. max)
}
```

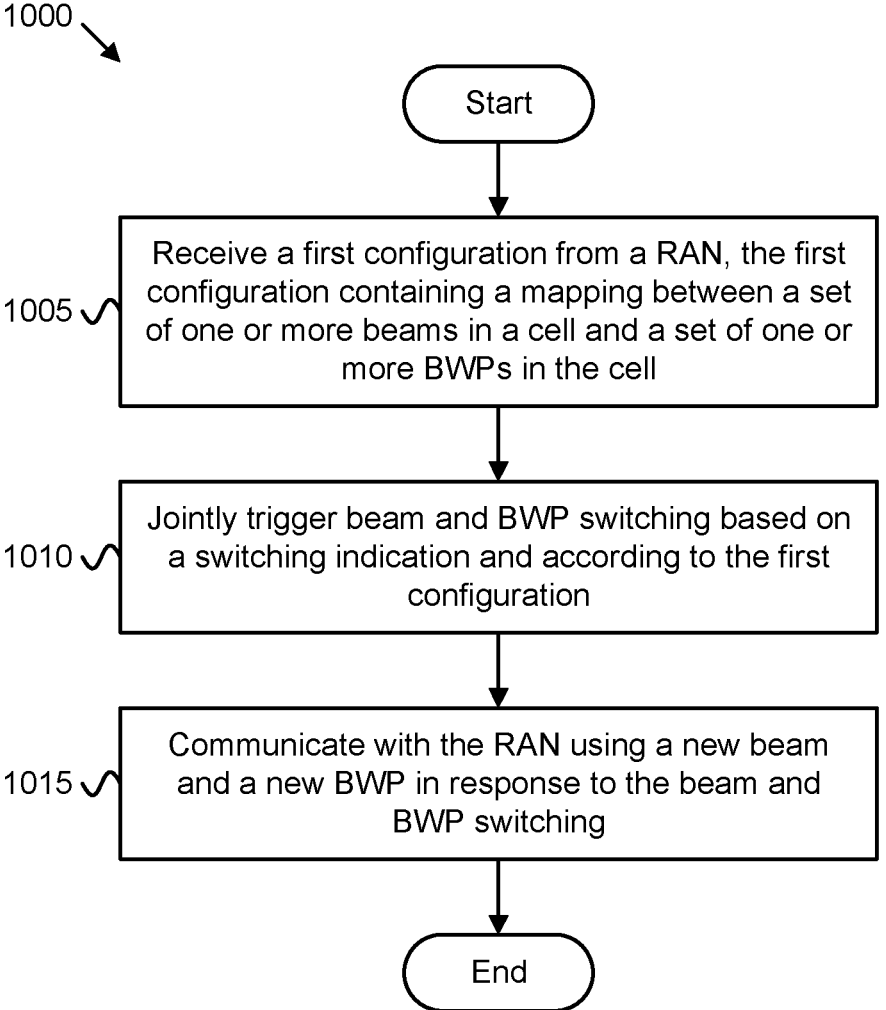

1000

Start

1005 — Receive a first configuration from a RAN, the first configuration containing a mapping between a set of one or more beams in a cell and a set of one or more BWPs in the cell 1010 — Jointly trigger beam and BWP switching based on a switching indication and according to the first configuration 1015 — Communicate with the RAN using a new beam and a new BWP in response to the beam and BWP switching End

FIG. 10

JOINT BEAM AND BANDWIDTH PART SWITCHING

CROSS-REFERENCE TO RELATED APPLICATIONS

This application claims priority to U.S. Provisional Patent Application No. 63/152,314 entitled "BWP AND BEAM SWITCHING IN NTN" and filed on Feb. 22, 2021 for Sher Ali Cheema, Ankit Bhamri, Ali Ramadan Ali, Majid Ghanbarinejad, and Seyedomid Taghizadeh Motlagh, which application is incorporated herein by reference.

FIELD

The subject matter disclosed herein relates generally to wireless communications and more particularly relates to bandwidth part ("BWP") management and beam switching in non-terrestrial networks ("NTNs").

BACKGROUND

In NTNs, a frequency reuse factor ("FRF") of greater than 1 may be used to enhance link budget by mitigating the inter cell/beam interference. Current Third Generation Partnership Project ("3GPP") specifications do not support a common signaling framework for BWP and beam switching.

BRIEF SUMMARY

Disclosed are procedures for BWP and beam switching. Said procedures may be implemented by apparatus, systems, methods, or computer program products.

One method at a User Equipment ("UE") for BWP and beam switching includes receiving a first configuration that contains a mapping between a set of beams and a set of bandwidth parts ("BWPs") in a cell. The method includes jointly triggering beam and bandwidth part ("BWP") switching based on a switching indication and according to the first configuration and communicating with a radio access network ("RAN") using a new beam and a new BWP in response to the beam and BWP switching.

One method at a RAN for BWP and beam switching includes transmitting a first configuration to at least one UE, the first configuration containing a mapping between a set of beams and a set of BWPs in a cell. The method includes jointly triggering beam and BWP switching at the at least one UE according to the first configuration and communicating with a at least one UE using a new beam and a new BWP in response to triggering the beam and BWP switching.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 5A is a diagram illustrating one embodiment of frequency reuse for a group of cells;

FIG. 5B is a diagram illustrating another embodiment of frequency reuse for a group of cells;

FIG. 7A is a diagram illustrating one embodiment of a Serving Cell Configuration information element ("IE");

FIG. 7B is a diagram illustrating another embodiment of a Serving Cell Configuration IE;

FIG. 10 is a flowchart diagram illustrating one embodiment of a first method for BWP management and beam switching.

DETAILED DESCRIPTION

Figure 1:
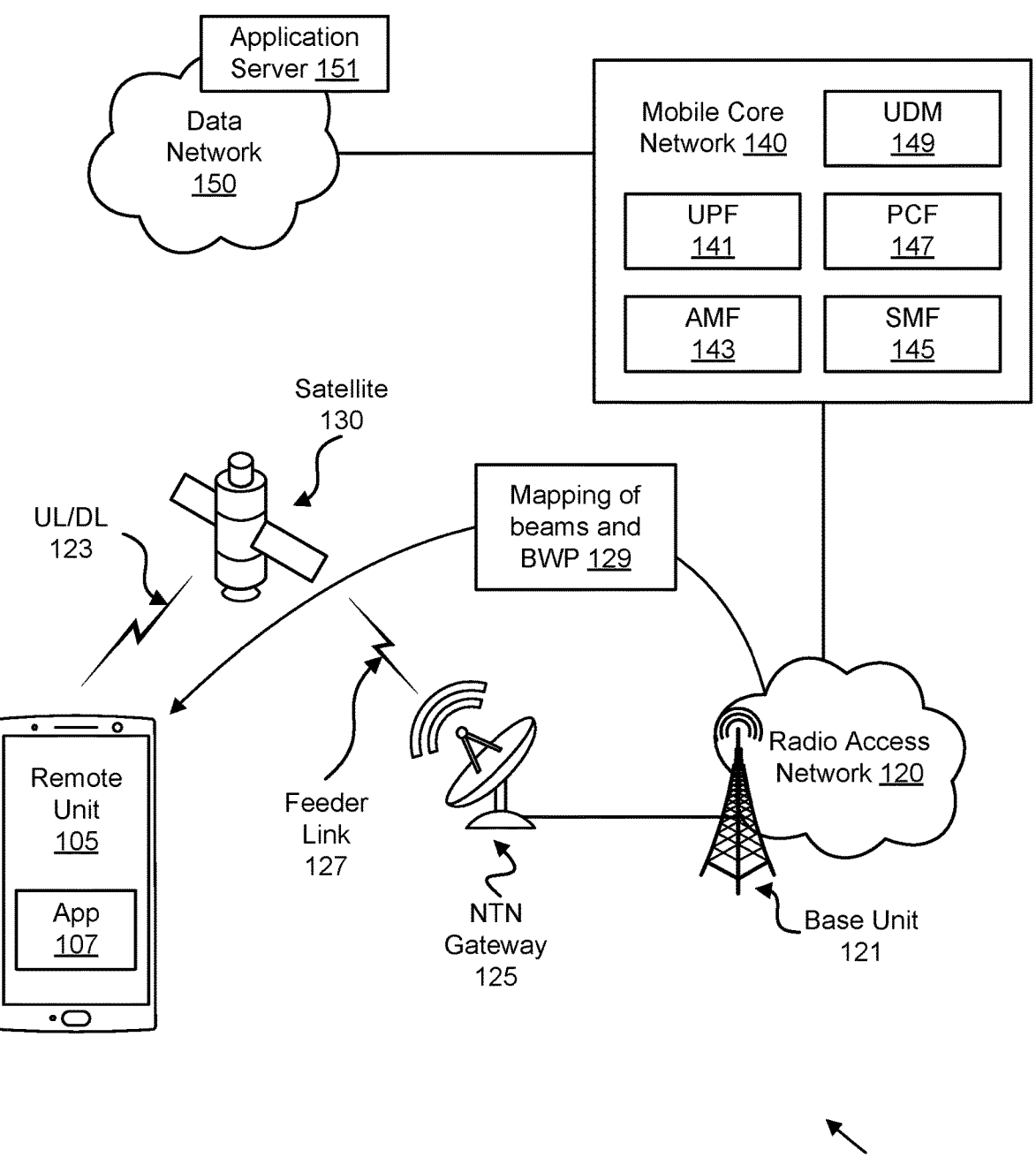
FIG. 1 is a block diagram illustrating one embodiment of a wireless communication system for BWP and beam switching.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart diagrams and/or block diagrams.

The call-flow diagrams, flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the call-flow, flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for BWP and beam switching. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

In NTN, frequency reuse factor of greater than one (1) is used to enhance link budget by mitigating the inter-cell/inter-beam interference. Current NR specifications support up to four bandwidth parts in a cell. Using these bandwidth parts for frequency reuse factor of 3 or 4 may result in an association of BWPs and beams. Depending upon the size of the cell, there may be a one-to-one mapping between beams and BWPs or to a set of beams and BWP. To reduce the overall signaling overhead, such mapping may be utilized to form a common signaling framework for BWP and beam switching. Current NR specifications do not support such association of beams and BWPs and such common switching framework. Moreover, in NTN, a group of UEs may require BWP switching simultaneously, whereas Rel 15/16's mechanism supports UE-specific BWP switching.

Described here are solutions for both UE-specific and group-specific signaling for joint triggering of BWPs and beams switching that is applicable for both earth-fixed cells and earth-moving cells. One solution includes a joint triggering method of BWP and beam switching either through a single field in the Downlink Control Information ("DCI"), such as Transmission Configuration Indicator ("TCI") field or through BWP index field in DCI with the help of a configured mapping table that defines the relationship between BWP and TCI states for an NTN cell configuration.

In the following descriptions, the terms antenna, panel, antenna panel, device panel and UE panel are used interchangeably. An antenna panel may be a hardware that is used for transmitting and/or receiving radio signals at frequencies lower than 6 GHz, e.g., frequency range 1 ("FR1"), or higher than 6 GHz, e.g., frequency range 2 ("FR2") or millimeter wave (i.e., "mmWave"). In some embodiments, an antenna panel may comprise an array of antenna elements, wherein each antenna element is connected to hardware such as a phase shifter that allows a control module to apply spatial parameters for transmission and/or reception of signals. The resulting radiation pattern may be called a beam, which may or may not be unimodal and may allow the device to amplify signals that are transmitted or received from spatial directions.

In some embodiments, an antenna panel may or may not be virtualized as an antenna port in the specifications. An antenna panel may be connected to a baseband processing module through a Radio Frequency ("RF") chain for each of transmission (egress) and reception (ingress) directions. A capability of a device in terms of the number of antenna panels, their duplexing capabilities, their beamforming capabilities, and so on, may or may not be transparent to other devices. In some embodiments, capability information may be communicated via signaling or, in some embodiments, capability information may be provided to devices without a need for signaling. In the case that such information is available to other devices, it can be used for signaling or local decision making.

In some embodiments, a device antenna panel (e.g., of a UE or RAN node) may be a physical or logical antenna array comprising a set of antenna elements or antenna ports that share a common or a significant portion of an RF chain (e.g., in-phase/quadrature ("I/Q") modulator, analog-to-digital ("A/D") converter, local oscillator, phase shift network). The device antenna panel or "device panel" may be a logical entity with physical device antennas mapped to the logical entity. The mapping of physical device antennas to the logical entity may be up to device implementation. Communicating (receiving or transmitting) on at least a subset of antenna elements or antenna ports active for radiating energy (also referred to herein as active elements) of an antenna panel requires biasing or powering on of the RF chain which results in current drain or power consumption in the device associated with the antenna panel (including power amplifier/low noise amplifier ("LNA") power consumption associated with the antenna elements or antenna ports). The phrase "active for radiating energy," as used herein, is not meant to be limited to a transmit function but also encompasses a receive function. Accordingly, an antenna element that is active for radiating energy may be coupled to a transmitter to transmit radio frequency energy or to a receiver to receive radio frequency energy, either simultaneously or sequentially, or may be coupled to a transceiver in general, for performing its intended functionality. Communicating on the active elements of an antenna panel enables generation of radiation patterns or beams.

In some embodiments, depending on device's own implementation, a "device panel" can have at least one of the following functionalities as an operational role of Unit of antenna group to control its transmit ("Tx") beam independently, Unit of antenna group to control its transmission power independently, Unit of antenna group to control its transmission timing independently. The "device panel" may be transparent to gNB. For certain condition(s), gNB or network can assume the mapping between device's physical antennas to the logical entity "device panel" may not be changed. For example, the condition may include until the next update or report from device or comprise a duration of time over which the gNB assumes there will be no change to the mapping.

A device may report its capability with respect to the "device panel" to the gNB or network. The device capability may include at least the number of "device panels." In one implementation, the device may support uplink ("UL") transmission from one beam within a panel; with multiple panels, more than one beam (one beam per panel) may be used for UL transmission. In another implementation, more than one beam per panel may be supported/used for UL transmission.

In some of the embodiments described, an antenna port is defined such that the channel over which a symbol on the antenna port is conveyed can be inferred from the channel over which another symbol on the same antenna port is conveyed. Two antenna ports are said to be quasi-co-located if the large-scale properties of the channel over which a symbol on one antenna port is conveyed can be inferred from the channel over which a symbol on the other antenna port is conveyed. For example, two signals 'A' and '13' are transmitted by the same TRP (Antenna Array) applying same spatial filter would experience similar channel conditions and thus have similar channel properties. Because of this, when the receiver side (e.g., UE) detects signal 'A' and ascertains channel properties of the received signal, it can apply the channel properties of signal 'A' to detect and decode signal '13' due to signals 'A' and '13' being quasi-co-located.

The large-scale channel properties include one or more of delay spread, Doppler spread, Doppler shift, average gain, average delay, and spatial receive ("Rx") parameters. Two antenna ports may be quasi-co-located with respect to a subset of the large-scale properties and different subset of large-scale properties may be indicated by a quasi-co-location ("QCL") Type. For example, qcl-Type may take one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}.

Spatial Rx parameters (e.g., for beam forming) may include one or more of: angle of arrival ("AoA"), Dominant AoA, average AoA, angular spread, Power Angular Spectrum ("PAS") of AoA, average angle of departure ("AoD"), PAS of AoD, transmit/receive channel correlation, transmit/receive beamforming, spatial channel correlation, etc.

An "antenna port" according to an embodiment may be a logical port that may correspond to a beam (resulting from beamforming) or may correspond to a physical antenna on a device. In some embodiments, a physical antenna may map directly to a single antenna port, in which an antenna port corresponds to an actual physical antenna. Alternately, a set or subset of physical antennas, or antenna set or antenna array or antenna sub-array, may be mapped to one or more antenna ports after applying complex weights, a cyclic delay, or both to the signal on each physical antenna. The physical antenna set may have antennas from a single module or panel or from multiple modules or panels. The weights may be fixed as in an antenna virtualization scheme, such as cyclic delay diversity ("CDD"). The procedure used to derive antenna ports from physical antennas may be specific to a device implementation and transparent to other devices.

In some of the embodiments described, a TCI-state associated with a target transmission can indicate parameters for configuring a QCL relationship between the target transmission (e.g., target reference signal ("RS") of Demodulation RS ("DM-RS") ports of the target transmission during a transmission occasion) and a source reference signal(s) (e.g., Synchronization Signal Block ("SSB"), Channel State Information Reference Signal ("CSI-RS"), and/or Sounding Reference Signal ("SRS")) with respect to QCL type parameter(s) indicated in the corresponding TCI state. A device can receive a configuration of a plurality of transmission configuration indicator states for a serving cell for transmissions on the serving cell.

In some of the embodiments described, a spatial relation information associated with a target transmission can indicate parameters for configuring a spatial setting between the target transmission and a reference RS (e.g., SSB/CSI-RS/SRS). For example, the device may transmit the target transmission with the same spatial domain filter used for reception the RS (e.g., downlink ("DL") RS such as SSB/CSI-RS). In another example, the device may transmit the target transmission with the same spatial domain transmission filter used for the transmission of the RS (e.g., UL RS such as SRS). A device can receive a configuration of a plurality of spatial relation information configurations for a serving cell for transmissions on the serving cell.

FIG. 1 depicts a wireless communication system 100 for BWP and beam switching, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 121 with which the remote unit 105 communicates via a satellite 130 using wireless communication links 123. As depicted, the mobile communication network includes an "on-ground" base unit 121 and non-terrestrial network ("NTN") gateway 125 which serves the remote unit 105 via satellite access.

Even though a specific number of remote units 105, base units 121, wireless communication links 123, RANs 120, satellites 130, NTN gateways 125 (e.g., satellite ground/earth devices), and mobile core networks 140 are depicted in FIG. 1, one of skill in the art will recognize that any number of remote units 105, base units 121, wireless communication links 123, RANs 120, satellites 130, NTN gateways 125, and mobile core networks 140 may be included in the wireless communication system 100.

In one implementation, the RAN 120 is compliant with the 5G system specified in the Third Generation Partnership Project ("3GPP") specifications. For example, the RAN 120 may be a Next Generation Radio Access Network ("NG-RAN"), implementing New Radio ("NR") Radio Access Technology ("RAT") and/or Long-Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals. In some embodiments, the remote units 105 communicate in a non-terrestrial network via UL and DL communication signals between the remote unit 105 and a satellite 130. In certain embodiments, the satellite 130 may communicate with the RAN 120 via an NTN gateway 125 using UL and DL communication signals between the satellite 130 and the NTN gateway 125. The NTN gateway 125 may communicate directly with the base units 121 in the RAN 120 to relay UL and DL communication signals.

Furthermore, the UL and DL communication signals may be carried over the wireless communication links 123 during at least a portion of their path between RAN 120 and the remote unit 105. Here, the RAN 120 is an intermediate network that provides the remote units 105 with access to the mobile core network 140. In various embodiments, the UL communication signals may comprise one or more uplink channels, such as the Physical Uplink Control Channel ("PUCCH") and/or Physical Uplink Shared Channel ("PUSCH"), while the DL communication signals may comprise one or more downlink channels, such as the Physical Downlink Control Channel ("PDCCH") and/or Physical Downlink Shared Channel ("PDSCH").

Moreover, the satellite 130 provides a non-terrestrial network allowing the remote unit 105 to access the mobile core network 140 via satellite access. While FIG. 1 depicts a transparent NTN system where the satellite 130 repeats the waveform signal for the base unit 121, in other embodiments the satellite 130 (for regenerative NTN system), or the NTN gateway 125 (for alternative implementation of transparent NTN system) may also act as base station, depending on the deployed configuration.

In some embodiments, the remote units 105 communicate with an application server 151 via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the RAN 120. The mobile core network 140 then relays traffic between the remote unit 105 and the application server 151 in the packet data network 150 using the PDU session. The PDU session represents a logical connection between the remote unit 105 and the User Plane Function ("UPF") 141.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 141. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a PDN Gateway ("PGW," not shown) in the mobile core network 140. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 140 via the RAN 120. Note that in the NTN scenario certain RAN entities or functions may be incorporated into the satellite 130. For example, the satellite 130 may be an embodiment of a Non-Terrestrial base station/base unit.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121. Note that during NR operation on unlicensed spectrum (referred to as "NR-U"), the base unit 121 and the remote unit 105 communicate over unlicensed (i.e., shared) radio spectrum.

In various embodiments, the remote unit 105 receives from the base unit 121, a mapping 129 of beams and BWPs. As described in greater detail below, the mapping 129 may contain at least one of: polarization information for each beam, polarization information for each BWP, a set of BWP identifiers ("BWP-Ids"), a set of TCI states, a satellite ephemeris, and/or a slot duration (i.e., until a subsequent beam and BWP switch) for applying a TCI state and a corresponding BWP-Id.

In one embodiment, the mobile core network 140 is a 5GC or an Evolved Packet Core ("EPC"), which may be coupled to a packet data network 150, like the Internet and private data networks, among other data networks. A remote unit 105 may have a subscription or other account with the mobile core network 140. In various embodiments, each mobile core network 140 belongs to a single mobile network operator ("MNO") and/or Public Land Mobile Network ("PLMN"). The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane functions including, but not limited to, an Access and Mobility Management Func-tion ("AMF") 143 that serves the RAN 120, a Session Management Function ("SMF") 145, a Policy Control Func-tion ("PCF") 147, a Unified Data Management function ("UDM") and a User Data Repository ("UDR," also referred to as "Unified Data Repository"). Although specific numbers and types of network functions are depicted in FIG. 1, one of skill in the art will recognize that any number and type of network functions may be included in the mobile core network 140.

The UPF(s) 141 is/are responsible for packet routing and forwarding, packet inspection, QoS handling, and external PDU session for interconnecting Data Network ("DN"), in the 5G architecture. The AMF 143 is responsible for termi-nation ofNon-Access Stratum ("NAS") signaling, NAS ciphering and integrity protection, registration management, connection management, mobility management, access authentication and authorization, security context manage-ment. The SMF 145 is responsible for session management (i.e., session establishment, modification, release), remote unit (i.e., UE) Internet Protocol ("IP") address allocation and management, DL data notification, and traffic steering con-figuration of the UPF 141 for proper traffic routing.

The PCF 147 is responsible for unified policy framework, providing policy rules to control plane functions, access subscription information for policy decisions in UDR. The UDM is responsible for generation of Authentication and Key Agreement ("AKA") credentials, user identification handling, access authorization, subscription management. The UDR is a repository of subscriber information and may be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 149.

In various embodiments, the mobile core network 140 may also include a Network Repository Function ("NRF") (which provides Network Function ("NF") service registra-tion and discovery, enabling NFs to identify appropriate services in one another and communicate with each other over Application Programming Interfaces ("APIs")), a Net-work Exposure Function ("NEF") (which is responsible for making network data and resources easily accessible to customers and network partners), an Authentication Server Function ("AUSF"), or other NFs defined for the Fifth Generation Core network ("5GC"). When present, the AUSF may act as an authentication server and/or authentication proxy, thereby allowing the AMF 143 to authenticate a remote unit 105. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "net-work slice" refers to a portion of the mobile core network 140 optimized for a certain traffic type or communication service. For example, one or more network slices may be optimized for enhanced mobile broadband ("eMBB") ser-vice. As another example, one or more network slices may be optimized for ultra-reliable low-latency communication ("URLLC") service. In other examples, a network slice may be optimized for machine type communication ("MTC") service, massive MTC ("mMTC") service, Internet-of-Things ("IoT") service. In yet other examples, a network slice may be deployed for a specific application service, a vertical service, a specific use case, etc.

A network slice instance may be identified by a single-network slice selection assistance information ("S-NSSAI") while a set of network slices for which the remote unit 105 is authorized to use is identified by network slice selection assistance information ("NSSAI"). Here, "NSSAI" refers to a vector value including one or more S-NSSAI values. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

While FIG. 1 depicts components of a 5G RAN and a 5G core network, the described embodiments for BWP and beam switching apply to other types of communication networks and RATs, including IEEE 802.11 variants, Global System for Mobile Communications ("GSM," i.e., a 2G digital cellular network), General Packet Radio Service ("GPRS"), Universal Mobile Telecommunications System ("UMTS"), LTE variants, CDMA 2000, Bluetooth, ZigBee, Sigfox, and the like.

Moreover, in an LTE variant where the mobile core network 140 is an EPC, the depicted network functions may be replaced with appropriate EPC entities, such as a Mobil-ity Management Entity ("MME"), a Serving Gateway ("SGW"), a PGW, a Home Subscriber Server ("HSS"), and the like. For example, the AMF 143 may be mapped to an MME, the SMF 145 may be mapped to a control plane portion of a PGW and/or to an MME, the UPF 141 may be mapped to an SGW and a user plane portion of the PGW, the UDM/UDR 149 may be mapped to an HSS, etc.

In the following descriptions, the term "RAN node" is used for the base station/base unit, but it is replaceable by any other radio access node, e.g., gNB, ng-eNB, eNB, Base Station ("BS"), Access Point ("AP"), etc. Additionally, the term "UE" is used for the mobile station/remote unit, but it is replaceable by any other remote device, e.g., remote unit, MS, ME, etc. Further, the operations are described mainly in the context of 5G NR. However, the below described solutions/methods are also equally applicable to other mobile communication systems for BWP and beam switch-ing.

Figure 2:
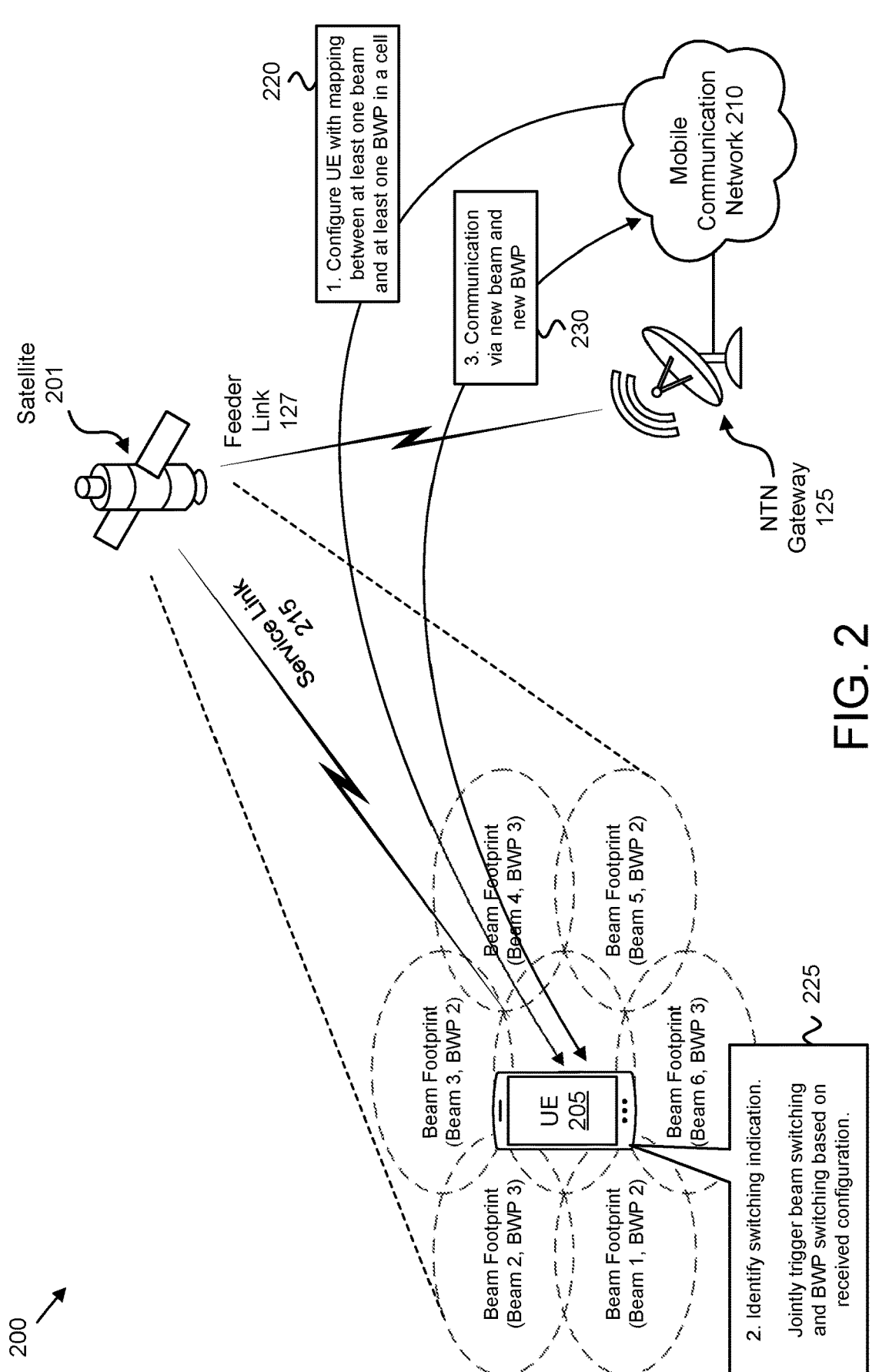
FIG. 2 is a diagram illustrating one embodiment of BWP management and beam switching in NTN.

FIG. 2 depicts an example implementation of a transpar-ent non-terrestrial network ("NTN") system 200, according to embodiments of the disclosure. The NTN system 200 includes a UE 205, which may be one embodiment of the remote unit 105. The NTN system 200 includes a mobile communication network 210, which may be one embodiment of the mobile core network 140 and/or RAN 120. The mobile communication network 210 is connected to the NTN gateway 125, which connects to the satellite 201 that serves the UE (i.e., via the service link 215) using at least one of a plurality of beams. Note that in other embodiments, the satellite 201 may be replaced with an aerial platform that supports the NTN using a plurality of beams.

As used herein, a transparent-payload NTN system implements frequency conversion and a Radio Frequency ("RF") amplifier in both up link and down link direction. Thus, the satellite 201 (or aerial platform) corresponds to an RF repeater analogue. Hence, the satellite 201 repeats the NR-Uu radio interface from the feeder link 127 (between the NTN gateway and the satellite) to the service link 215 (between the satellite 201 and the UE 205) and vice versa.

The Satellite Radio Interface ("SRI") on the feeder link 127 is the NR-Uu. In other words, the satellite 201 does not terminate NR-Uu. The NTN gateway 125 supports all necessary functions to forward the signal of NR-Uu interface. Different transparent-payload satellites 201 may be connected to the same gNB on the ground. While the NTN depicted in FIG. 2 depicts a transparent-payload NTN system, in other embodiments the NTN system may implement a regenerative-payload system where the satellite 201 acts as the mobile communication network 210 (e.g., performs gNB/RAN functions).

As used herein, in a regenerative-payload satellite architecture, the satellite payload implements regeneration of the signals received from Earth. The satellite payload may also provide Inter-Satellite Links ("ISL") between satellites. In one embodiment of regenerative-payload NTN, the NR-Uu radio interface on the service link 215 is between the UE 205 and the satellite 201. In another embodiment, the Satellite Radio Interface ("SRI") is on the feeder link 127 between the NTN gateway 125 and the satellite 201. Note that SRI is a transport link between NTN gateway 125 and the satellite 201. The NTN gateway 125 is a Transport Network Layer node, and supports all necessary transport protocols. In various embodiments, the NTN gateway 125 may implement gNB and/or RAN functions, for example beam management functions in NTN. In other embodiments, the satellite 201 may implement gNB and/or RAN functions, for example beam management functions in NTN.

The projection of each beam of the satellite 201 to the ground defines a beam footprint. As described herein, the UE may dynamically adapt its rate of RS measurement and to reporting based on its position relative to the beam footprint. Here, the relative position may be explicitly determined from the UE location (i.e., geographical location) or may be implicitly indicated by a current RS measurement, such as Layer-1 Reference Signal Received Power ("L1-RSRP") and/or Layer-1 Signal-to-Interference-Plus-Noise Ratio ("L1-SINR"), Reference Signal Received Quality ("RSRQ"), Received Signal Strength Indicator ("RSSI"), etc.

FIG. 2 additionally depicts a procedure for dynamic adaptation of measurement/reporting. At Step 1 the mobile communication network 210 configures the UE 205 with mapping between at least one beam and at least one BWP in a cell (see messaging 220). Here, the mapping includes one or more of: polarization information for each beam, polarization information for each BWP, a set of BWP-Ids, a set of TCI states, a satellite ephemeris, and/or a slot duration for applying a TCI state and a corresponding BWP-Id, e.g., until a subsequent beam and BWP switch.

At Step 2, the UE 205 detects a switching indication and jointly triggers beam switching and BWP switching based on received configuration (see block 225). Various embodiments of switching indications are described below. In one embodiment, the switching indication is a UE-internal condition, such as expiry of a timer. In another embodiment, the switching indication is a UE-external condition, such as a specific signal from the network, DCI with specific format, fields, and/or values, etc.

At Step 3, after switching both beam and BWP, the UE 205 communicates with the mobile communication network 210 via the satellite 201 and NTN gateway 125 using the new beam and new BWP (see signaling 230).

Described herein are enhancements to the beam-management related signaling for BWP and beam switching in NTN, e.g., to reduce the overall signaling overhead. In NR, beam switching and BWP switching are independent with no direct association with each other. However, in NTN, for frequency reuse factor of greater than one, there may be a one-to-one or one-to-multiple mapping between BWPs and beams (and vice versa). Moreover, beam level mobility in the case of Low-Earth Orbit ("LEO") satellites would result in frequent beam and BWP switching. Using the knowledge of satellite ephemeris and association of BWPs and beam in an NTN cell, signaling overhead can be significantly reduced.

One solution includes a joint triggering method of BWP and beam switching either through a single field in the DCI such as TCI field or through BWP index field in DCI with the help of a configured mapping table that defines the relationship between BWP and TCI states for an NTN cell configuration.

Another solution includes methods for simultaneous switching of a set of BWPs and/or beams are proposed by employing either a semi-static indication using Radio Resource Control ("RRC") or through a dynamic indication using DCI. Another solution includes common triggering of BWPs and/or beams switching for all users in a beam or for a set of users in a beam/cell is proposed. Another solution includes simultaneous triggering of Uplink ("UL"), and Downlink ("DL") BWPs switching is proposed to avoid latency in NTN scenario.

It should be noted that throughout the disclosure, the terms "symbol," "slot," and "Transmission Time Interval" (abbreviated "TTI") are terms used to refer to a time unit with a particular duration. For example, symbol could be a fraction/percentage of an Orthogonal Frequency Division Multiplexing ("OFDM") symbol length associated with a particular subcarrier spacing ("SCS"). As another example, a slot may refer to a predetermined set of symbols and can be a fraction/portion of a radio frame. In the following, an UL transmission can be comprised of multiple transmissions and may contain a PUSCH transmission, a PUCCH transmission, Physical Random Access Channel ("PRACH") transmission, a Scheduling Request ("SR"), and/or an UL reference signal such as sounding reference signal ("SRS").

Figure 3:
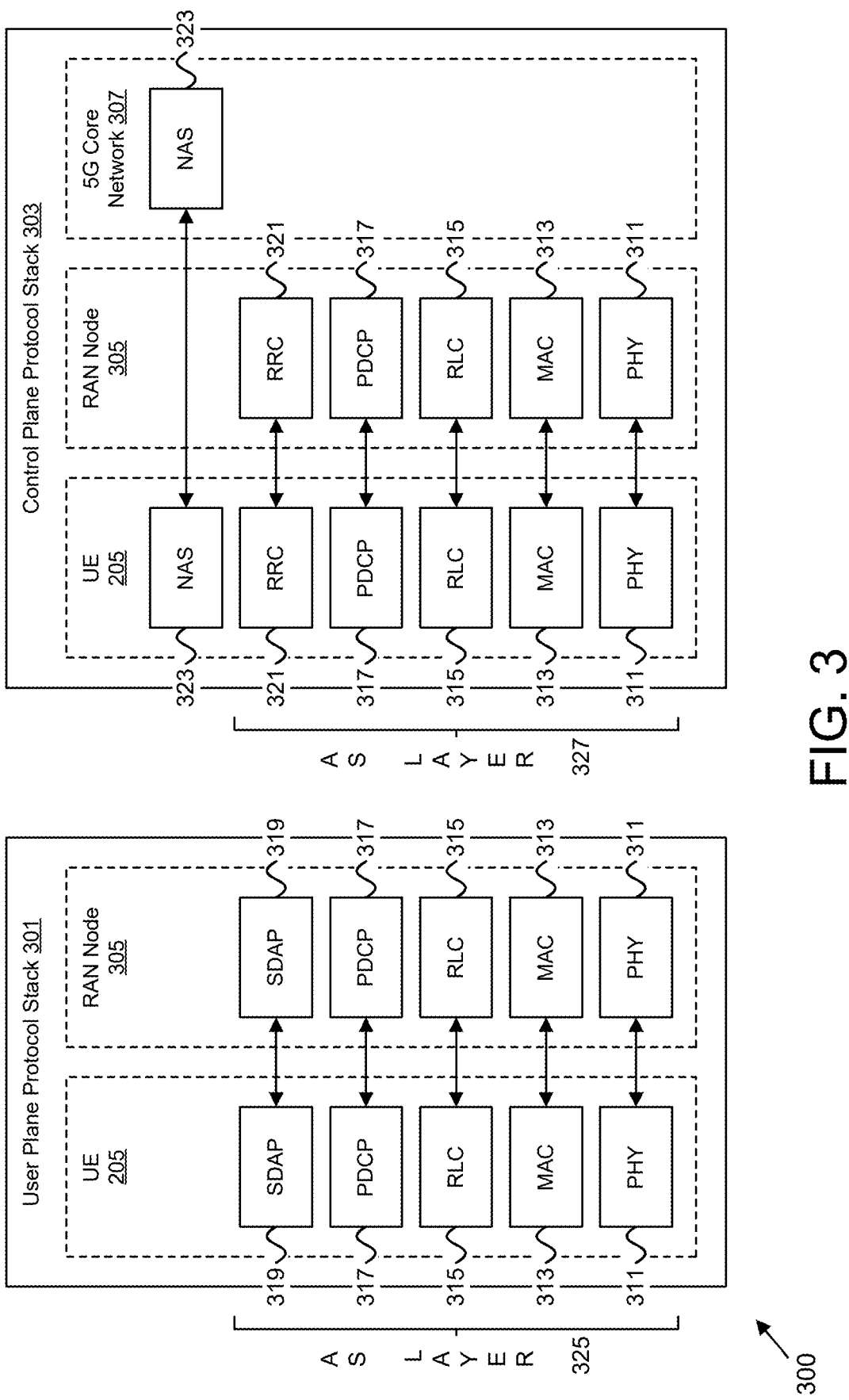
FIG. 3 is a diagram illustrating one embodiment of a 3GPP New Radio ("NR") protocol stack.

FIG. 3 depicts a NR protocol stack 300, according to embodiments of the disclosure. While FIG. 3 shows a UE 205, a RAN node 305 and the 5G core network 307, these are representative of a set of remote units 105 interacting with a base unit 121 and a mobile core network 140. As depicted, the NR protocol stack 300 comprises a User Plane protocol stack 301 and a Control Plane protocol stack 303. The User Plane protocol stack 301 includes a physical ("PHY") layer 311, a Medium Access Control ("MAC") sublayer 313, a Radio Link Control ("RLC") sublayer 315, a Packet Data Convergence Protocol ("PDCP") sublayer 317, and Service Data Adaptation Protocol ("SDAP") layer 319. The Control Plane protocol stack 303 includes a PHY layer 311, a MAC sublayer 313, a RLC sublayer 315, and a PDCP sublayer 317. The Control Plane protocol stack 303 also includes a Radio Resource Control ("RRC") layer 321 and a Non-Access Stratum ("NAS") layer 323.

The AS layer 325 (also referred to as "AS protocol stack") for the User Plane protocol stack 301 consists of at least SDAP, PDCP, RLC and MAC sublayers, and the PHY layer. The AS layer 327 for the Control Plane protocol stack 303 consists of at least RRC, PDCP, RLC and MAC sublayers, and the PHY layer. The Layer-2 ("L2") is split into the SDAP, PDCP, RLC and MAC sublayers. The Layer-3 ("L3") includes the RRC sublayer 321 and the NAS layer 323 for the control plane and includes, e.g., an Internet Protocol ("IP") layer or PDU Layer (note depicted) for the user plane. L1 and L2 are referred to as "lower layers," while L3 and above (e.g., transport layer, application layer) are referred to as "higher layers" or "upper layers."

The PHY layer 311 offers transport channels to the MAC sublayer 313. The MAC sublayer 313 offers logical channels to the RLC sublayer 315. The RLC sublayer 315 offers RLC channels to the PDCP sublayer 317. The PDCP sublayer 317 offers radio bearers to the SDAP sublayer 319 and/or RRC layer 321. The SDAP sublayer 319 offers QoS flows to the core network (e.g., 5GC). The RRC layer 321 provides for the addition, modification, and release of Carrier Aggregation ("CA") and/or Dual Connectivity ("DC"). The RRC layer 321 also manages the establishment, configuration, maintenance, and release of Signaling Radio Bearers ("SRBs") and Data Radio Bearers ("DRBs").

The MAC layer 313 is the lowest sublayer in the Layer-2 architecture of the NR protocol stack. Its connection to the PHY layer 311 below is through transport channels, and the connection to the RLC layer 315 above is through logical channels. The MAC layer 313 therefore performs multiplexing and demultiplexing between logical channels and transport channels: the MAC layer 313 in the transmitting side constructs MAC PDUs, known as transport blocks, from MAC Service Data Units ("SDUs") received through logical channels, and the MAC layer 313 in the receiving side recovers MAC SDUs from MAC PDUs received through transport channels.

The MAC layer 313 provides a data transfer service for the RLC layer 315 through logical channels, which are either control logical channels which carry control data (e.g., RRC signaling) or traffic logical channels which carry user plane data. On the other hand, the data from the MAC layer 313 is exchanged with the PHY layer 311 through transport channels, which are classified as downlink or uplink. Data is multiplexed into transport channels depending on how it is transmitted over the air.

The PHY layer 311 is responsible for the actual transmission of data and control information via the air interface, i.e., the PHY layer 311 carries all information from the MAC transport channels over the air interface on the transmission side. Some of the important functions performed by the PHY layer 311 include coding and modulation, link adaptation (e.g., Adaptive Modulation and Coding ("AMC")), power control, cell search (for initial synchronization and handover purposes) and other measurements (inside the 3GPP system (i.e., NR and/or LTE system) and between systems) for the RRC layer 321. The PHY layer 311 performs transmissions based on transmission parameters, such as the modulation scheme, the coding rate (i.e., the modulation and coding scheme ("MCS")), the number of physical resource blocks etc.

Figure 4B:
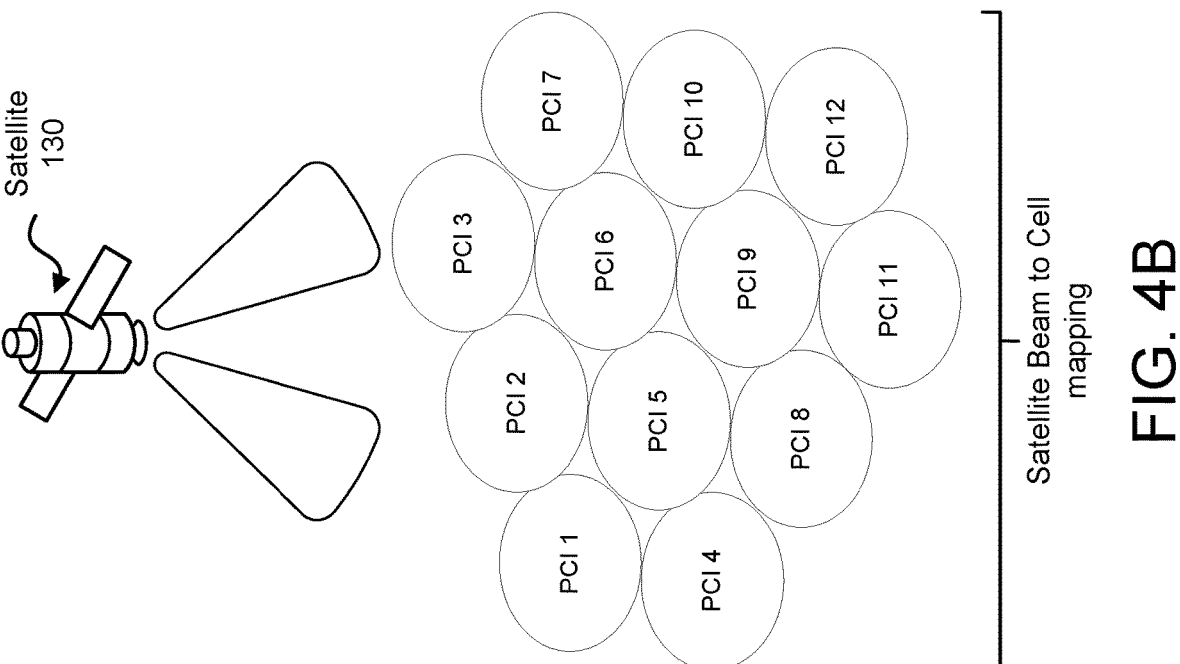
FIG. 4B is a diagram illustrating another embodiment of satellite-beam-to-cell mapping.
Figure 4A:
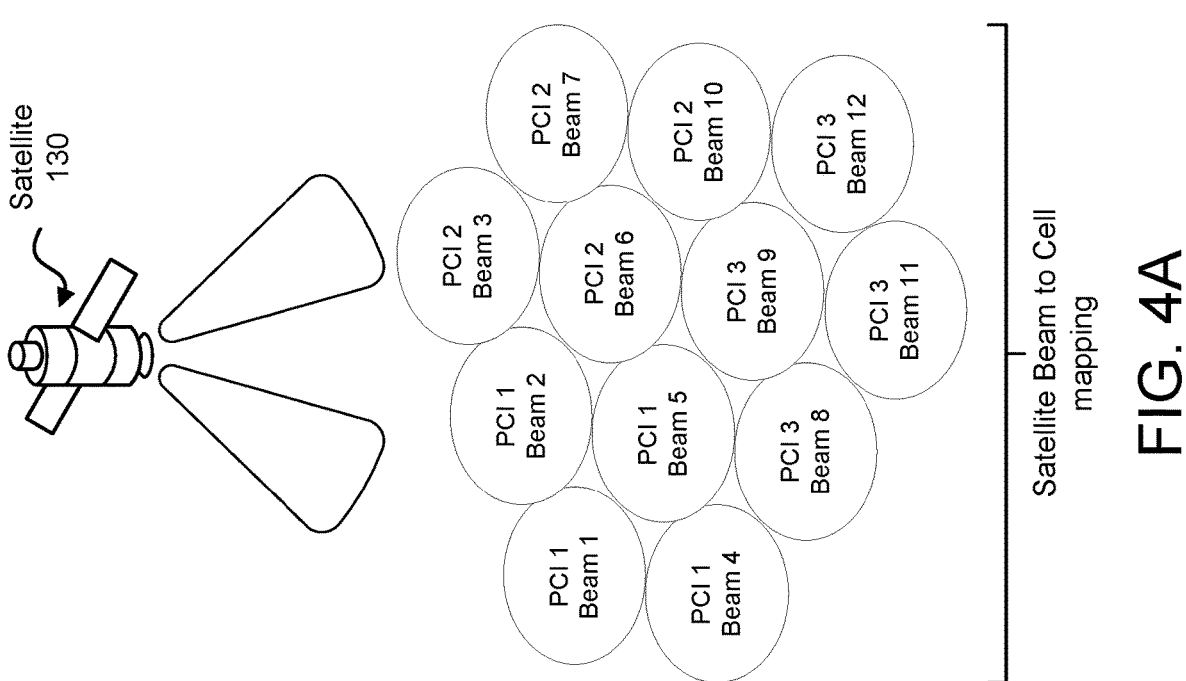
FIG. 4A is a diagram illustrating one embodiment of satellite-beam-to-cell mapping.

FIGS. 4A-4B depicts cell mapping scenarios in NTN. FIG. 4A depicts one option (referred to as "option (a)") where several satellite beams are in the same cell. In the depicted embodiment, the Physical Cell Identity ("PCI") identifies each cell in the NTN. Accordingly, all beams comprising a particular cell share the same PCI. Note that a satellite beam can consist of one or more SSB beams.

FIG. 4B depicts another option (referred to as "option (b)") where each satellite beam is considered as cell. In the depicted embodiment, the PCI is unique to each beam in the NTN, thus no beam identifier is needed. Note that a satellite beam can consist of one or more SSB beams.

In case of operation with one beam per cell, physical layer (i.e., L1) behavior for NTN is similar to terrestrial network behavior, although more higher layer procedures are required due to frequent cell/beam handover, especially for satellite access provided by LEO satellites. In case of operation with multiple beams per cell, physical layer (i.e., L1) behavior for NTN may reuse L1 beam management techniques defined for terrestrial networks.

FIG. 5A depicts a first frequency use scenario. In FIG. 5A, the frequency reuse factor ("FRF") is equal to one. Therefore, all cells/beams use the same radio frequencies (thus introducing inter-cell/inter-beam interference). However, with Frequency Reuse Factor-1 (FRF-1) scheme, the per-beam bandwidth can occupy the entire wideband carrier.

FIG. 5B depicts a second frequency use scenario, where a frequency reuse factor of 3 is implemented to reduce inter-cell interference. In NR NTN, frequency reuse schemes (e.g., where the FRF is greater than one) may be implemented to mitigate inter-cell (and/or inter-beam) co-channel interference. In certain embodiments, Spatial Frequency reuse techniques are used to improve the Signal-to-Interference-Plus-Noise Ratio ("SINR"); however, Spatial Frequency reuse inherently limits the per-beam bandwidth and the system capacity. The traditional Frequency Reuse Factor-3 (FRF-3) scheme, for example, offers a protection against inter-cell interference. However, only a third of the spectral resources are used within each cell. NTN System level simulations conducted during NTN study item phase have shown potential gains of FRF-3 scheme.

In case of frequency reuse larger than one, the concept of using BWPs to enable a frequency reuse may be implemented, e.g., mapping different BWPs to different parts of the system bandwidth and different beams would allow L1 based mobility within a large cell. Specifically, for a flexible Frequency Reuse, a UE may be configured with beam-specific BWP to replace the traditional role of the component carrier, which is not as flexible as a BWP. Thus, for NTN the same component carrier may be used on all cells (e.g., frequency reuse of 1), but each beam is assigned a beam-specific BWP. For the configuration of beam specific BWPs in NTN, the configuration parameters may include starting position, size and the subcarrier spacing—as defined for terrestrial networks. In addition, for NTN an indication of the associated beam needs to be added, i.e., a beam-index, such as CSI-RS associated with the beam.

Figure 5C:
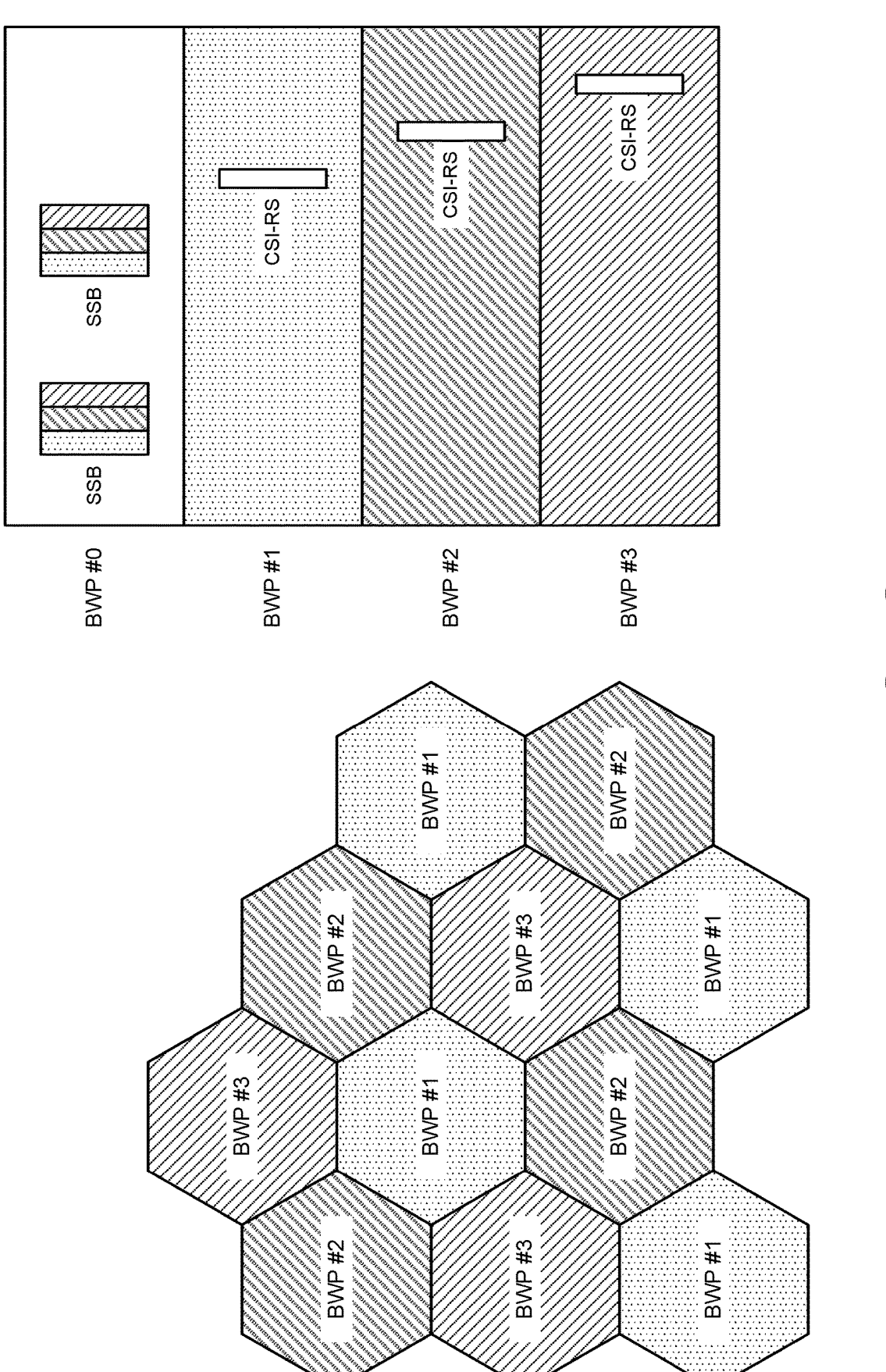
FIG. 5C is a diagram illustrating one embodiment of a cell where multiple beams are in a cell and each beam is mapped to a BWP.

FIG. 5C shows a scenario where multiple beams are in a cell and each beam is mapped to a BWP. The UE first uses the initial BWP#0, but then switches from the initial BWP#0 to the serving BWP#x. Similarly in this case, SSBs via all beams within the cell are transmitted on BWP#0. In one embodiment, the UE performs DL synchronization and Random-Access procedure (aka 'RACH procedure') on BWP#0. After entering the RRC Connected state, the BWP corresponding to the detected SSB (i.e., satellite beam) may be configured to the UE as an active BWP (e.g., RRC-configured BWP). This requires that the satellite beam transmits the SSB on BWP#0 in addition to transmit PDCCH/PDSCH on the associated BWP.

In other words, the BWP#0 can be used for initial cell access with all beams and corresponding SSBs. For a connected UE, an active BWP#1, #2, or #3 can be used with several satellite beams. Whenever the UE makes measurements on a BWP that is different from the BWP of the current serving satellite beam, the UE will need to retune its carrier frequency for measurements on the non-active BWP and perform frequency compensation to report measurements frequently—i.e., every 10 seconds typically in LEO scenario with earth-moving beams.

In various embodiments, the UE will measure Channel State Information ("CSI") resources on different BWPs for multiple times with BWP switching. For example, UE firstly measures CSI resource#1 on active BWP as BWP#1, then UE switches to BWP#2 after receiving DCI indicating BWP switching from the gNB. Thereafter, an aperiodic CSI report associated with CSI resource#2 on BWP#2 would be triggered, the UE performs CSI measurement on BWP#2. Similarly, the UE may switch to BWP#3 for CSI resource #3 measurement. However, this BWP switching may cause large delay and DL signaling overhead as every time the UE needs to receive BWP switching indication from the gNB. The large delay will cause inaccurate beam measurement results. Besides the DL overhead, the UL signaling overhead for CSI report will be large as differential Reference Signal Received Power ("RSRP") report cannot be applied.

Regarding Bandwidth parts, currently the Sub-Carrier Spacing ("SCS") value (e.g., numerology) is associated with a BWP which is configured/indicated by network to the UE. In various embodiments, the BWP conforms with section 4.4.5 of 3GPP Technical Specification ("TS") 38.211.

In some embodiments, the bandwidth part is a subset of contiguous common resource blocks for a given numerology (e.g., as defined in 3GPP TS 38.211 clause 4.4.4.3) in bandwidth part on a given carrier. The starting position $$N_{BWP,i}^{start,\mu}$$

and the number of resource blocks $$N_{BWP,i}^{size,\mu}$$

in a bandwidth part shall fulfil $$N_{grid,x}^{start,\mu} \leq N_{BWP,i}^{start,\mu} < N_{grid,x}^{start,\mu} + N_{grid,x}^{size,\mu} \text{ and } N_{grid,x}^{start,\mu} <$$

$$N_{BWP,i}^{start,\mu} + N_{BWP,i}^{size,\mu} \leq N_{grid,x}^{start,\mu} + N_{grid,x}^{size,\mu}$$

respectively. Configuration of a bandwidth part may be as described in clause 12 of 3GPP TS 38.213.

A UE can be configured with up to four bandwidth parts in the downlink with a single downlink bandwidth part being active at a given time. The UE is not expected to receive PDSCH, PDCCH, or CSI-RS (except for Radio Resource Management ("RRM")) outside an active bandwidth part.

A UE can be configured with up to four bandwidth parts in the uplink with a single uplink bandwidth part being active at a given time. If a UE is configured with a supplementary uplink, the UE can in addition be configured with up to four bandwidth parts in the supplementary uplink with a single supplementary uplink bandwidth part being active at a given time. The UE shall not transmit PUSCH or PUCCH outside an active bandwidth part. For an active cell, the UE shall not transmit SRS outside an active bandwidth part.

Regarding BWP Activation/Deactivation and Switching, according to section 5.15 of 3GPP TS 38.321, BWP operation, BWP selection (or BWP switching) can be done by several different ways as listed below:

RRC-Based Adaptation: It is more suitable for semi-static cases since the processing of RRC messages requires extra time, letting the latency reach ~10 msec. Due to longer switching latency and signaling overhead, an RRC-based method can be used for configuring (or reconfiguring) a BWP set at any stage of the call, or for slow adaptation type services (e.g., voice) where the resource allocation is not changing rapidly within the same data session.

MAC control element ("CE"): It is used upon initiation of RACH procedure.

DCI-Based Adaptation: It is based on PDCCH channel where a specific BWP can be activated by BWP indicator in DCI Format 0_1/0_2 (UL Grant) and Format 1_1/1_2 (DL scheduling). This method better fits on-the-fly BWP switching as using this method the latency is as low as 2 msec. However, this method requires additional considerations for error handling as UE may fail to decode the DCI with BWP activation/deactivation command. DCI based DL BWP switching also occurs when a dormant DL BWP is configured, and UE enters and leaves dormant BWP based on indication in a PDCCH DCI.

Timer-Based implicit fallback to default BWP is a mechanism designed to mitigate possible DCI errors. If the UE is not explicitly scheduled with a BWP after the timer expires, it will automatically switch to the default BWP.

The DCI based mechanism, although more prompt or lower BWP switching delay than the one based on MAC CE, requires additional consideration for error case handling, i.e., the case when a UE fails to decode the DCI containing the BWP activation/deactivation command. To help to recover from such a DCI lost scenario, the activation/deactivation of DL BWP (or DL/UL BWP pair for the case of unpaired spectrum) by means of timer (bwp-inactivityTimer) is also introduced. With this mechanism, if a UE is not scheduled for a certain amount of time, i.e., expiration of timer, the UE switches its active DL BWP (or DL/UL BWP pair) to the default one.

There is an initial active BWP for a UE during the initial access until the UE is explicitly configured with BWPs during or after RRC connection establishment. The initial active BWP is the default BWP, unless configured otherwise.

As per 3GPP NR Release 16 ("Rel-16"), for a UE, there is at most one active DL BWP and at most one active UL BWP. The Hybrid Automatic Repeat Request ("HARQ") retransmission across different BWPs is supported when a UE's active BWP is switched. As used herein, "HARQ-ACK" may represent collectively the Positive Acknowledge ("ACK") and the Negative Acknowledge ("NACK") and Discontinuous Transmission ("DTX"). ACK means that a Transport Block ("TB") is correctly received while NACK (or NAK) means a TB is erroneously received and DTX means that no TB was detected. Further details related to BWP operation are described below with reference to section 12 of TS 38.213.

Specifically, A UE receives PDCCH and PDSCH in a DL BWP according to a configured SCS and Cyclic Prefix ("CP") length for the DL BWP. A UE transmits PUCCH and PUSCH in an UL BWP according to a configured SCS and CP length for the UL BWP.

If a bandwidth part indicator field is configured in DCI format 1_1, the bandwidth part indicator field value indicates the active DL BWP, from the configured DL BWP set, for DL receptions as described in 3GPP TS 38.212. If a bandwidth part indicator field is configured in DCI format 0_1, the bandwidth part indicator field value indicates the active UL BWP, from the configured UL BWP set, for UL transmissions as described in 3GPP TS 38.212.

If a bandwidth part indicator field is configured in DCI format 0_1 or DCI format 1_1 and indicates an UL BWP or a DL BWP different from the active UL BWP or DL BWP, respectively. For each information field in the received DCI format 0_1 or DCI format 1_1, the if the size of the information field is smaller than the one required for the DCI format 0_1 or DCI format 1_1 interpretation for the UL BWP or DL BWP that is indicated by the bandwidth part indicator, respectively, then the UE prepends zeros to the information field until its size is the one required for the interpretation of the information field for the UL BWP or DL BWP prior to interpreting the DCI format 0_1 or DCI format 1_1 information fields, respectively.

Otherwise, if the size of the information field is larger than the one required for the DCI format 0_1 or DCI format 1_1 interpretation for the UL BWP or DL BWP that is indicated by the bandwidth part indicator, respectively, then the UE uses a number of least significant bits of DCI format 0_1 or DCI format 1_1 equal to the one required for the UL BWP or DL BWP indicated by bandwidth part indicator prior to interpreting the DCI format 0_1 or DCI format 1_1 information fields, respectively. Moreover, regardless of the size of the information field, the UE shall set the active UL BWP or DL BWP to the UL BWP or DL BWP indicated by the bandwidth part indicator in the DCI format 0_1 or DCI format 1_1, respectively.

If a bandwidth part indicator field is configured in DCI format 0_1 and indicates an active UL BWP with different SCS configuration u, or with different number $$N^{BWP}_{(RB-set)}$$

of Resource Block ("RB") sets, than a current active UL BWP, the UE determines an uplink frequency domain resource allocation Type 2 based on X' bits and Y' bits that are generated by independently truncating or padding the X most significant bits ("MSBs") and the Y least significant bits ("LSBs") 3GPP TS 38.214 of the frequency domain resource assignment field of DCI format 0_1, where truncation starts from the MSBs of the X bits or the Y bits, zero-padding prepends zeros to the X bits or the Y bits.

According to embodiments of the first solution, the beam and the BWP switch is jointly triggered either through a single field in the DCI such as TCI field or through BWP index field in DCI with the help of a configured mapping table that indicates the relationship between beam(s) (TCI state(s) with at least Quasi-Co-Location ("QCL") type-D assumption/indication) and BWP(s) for a cell. The UE can be configured with this mapping information through RRC Config message (or Re-Config message), where this information may be added in IE pdsch-ConfigCommon or in IE pdsch-Config by including the list of configured TCI states in the cell for BWPs other than the active BWP.

In one implementation of the first solution, when there is one-to-one mapping of BWP-Id and TCI state, the triggering for beam and BWP switching may be through TCI state or BWP-Id. In another implementation, when a BWP-Id is associated to a set of TCI states, the joint triggering can be through TCI field.

Figure 6A:
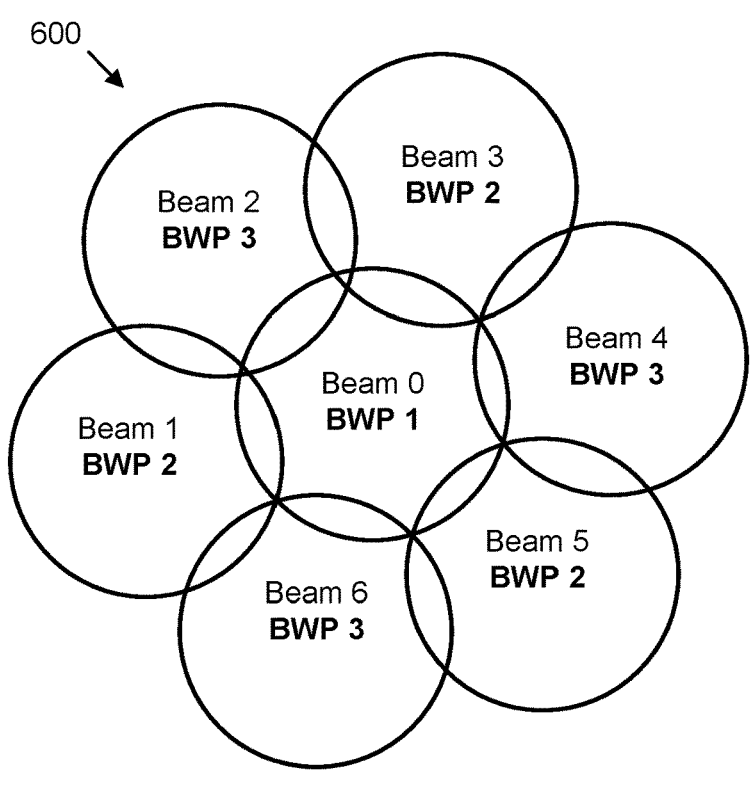
FIG. 6A is a diagram illustrating one embodiment of beam and BWP association.

FIG. 6A depicts one example of beam and BWP association 600 for the case of FRF=3, with 7 beams, according to embodiments of the first solution. In case (a) (shown in FIG. 6A), an FRF=3 is realized by 3 different BWPs that may be non-overlapping in the frequency domain. In some embodiments, BWPs associated with adjacent beams (or beams that are otherwise overlapping geographically) may further be separated by a guard band. The guard band may be determined by a UE capability. Alternatively, in some embodiments, BWPs associated with adjacent beams may not be further separated by a guard band by configuration, but a guard band may be applied based on a UE capability. An example of relationship between BWP-Id and TCI-State for case (a) is given in Table 1, below:

TABLE 1

| Example of relationship between BWP-Id and TCI-State for case (a) | |
| --- | --- |
| TCI State (lay out in FIG. 6A) | DL BWP-Id |
| 0 | BWP 1 |
| 1, 3, 5 | BWP 2 |
| 2, 4, 6 | BWP 3 |

Figure 6B:
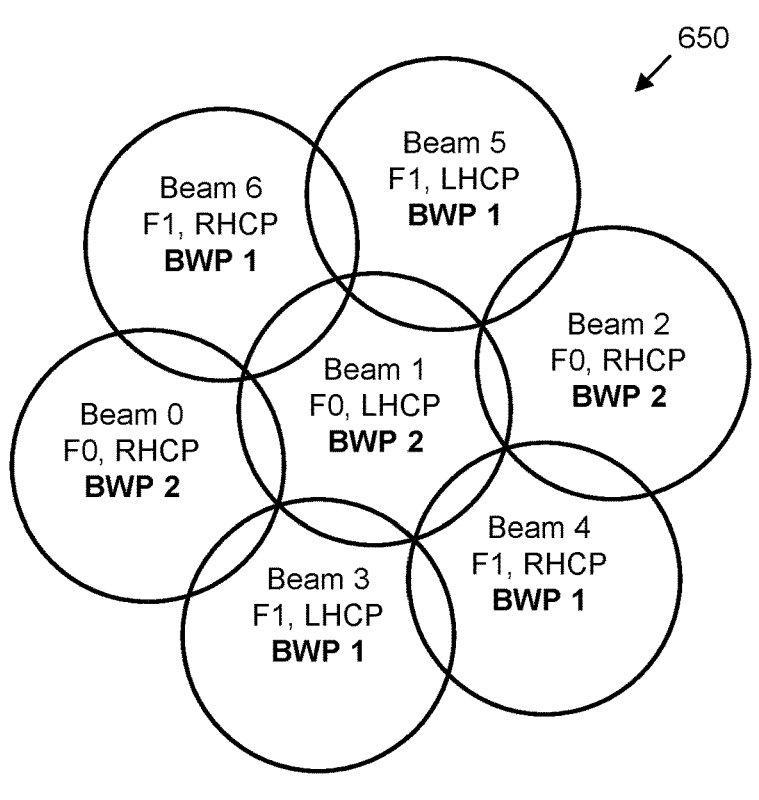
FIG. 6B is a diagram illustrating another embodiment of beam and BWP association.

FIG. 6B depicts one example of beam and BWP association 650 for the case of FRF=4, with 7 beams, according to embodiments of the first solution. In case (b) (shown in FIG. 6B), an FRF=4 is realized by 2 different BWPs and 2 circular polarizations (i.e., Left-Hand Circular Polarization ("LHCP") and Right-Hand Circular Polarization ("RHCP")), hence resulting in the FRF of 2×2=4. Similar to case (a), a guard band may be applied by configuration or based on a UE capability when using BWPs associated with adjacent beams (or geographically overlapping beams otherwise). An example of relationship between BWP-Id and TCI-State for case (a) is given in Table 2, below:

TABLE 2

| Example of relationship between BWP-Id and TCI-State for case (b) | | |
| --- | --- | --- |
| TCI State (lay out in FIG. 6B) | DL BWP-Id | Circular polarization |
| 3, 5 | BWP 1 | LHCP |
| 1 | BWP 2 | LHCP |
| 4, 6 | BWP 1 | RHCP |
| 0, 2 | BWP 2 | RHCP |

Both cell configurations have different relationship between BWPs and beams. Please note that this is an example and other combinations or methods to associate BWP Id(s) and beam(s) (TCI states) could be used (such as different table for individual FRFs). According to example table for FRF=3 if the UE is indicated with TCI state 0 by DCI field, then UE is expected to use BWP1, but when the UE is indicated with a TCI state=1 or 3 or 5, then UE is expected to switch to BWP2 in addition to the beam switch as well.

In some embodiments, a combination of the two cases (i.e., case (a) and case (b)) may be applied, e.g., beams are associated with different BWPs for a coarse separation, and jointly with a circular polarization for a finer polarization. In some realizations, the circular polarization may be indicated by a lower layer signaling rather than a configuration.

In case of beam level mobility for LEO satellites where there is frequent switching of beams, there may not be a need to schedule data to the next BWP with different scheduling parameters. In such cases, a set of BWPs may use the same parameters that are scheduled for first DL BWP if there are sufficient resources, taking into the account other already scheduled UEs in the new BWP. Therefore, in one implementation of the first solution, a parameter such as a single-bit additional field may be added indicating that same parameters can be used for next BWP, whereas a list of common parameters may be defined in RRC signaling. In another implementation of the first solution, it may be indicated in the mapping table that which combination of TCI state identifiers ("TCI-Ids") and BWP-Ids are associated with which common BWP parameters.

In one implementation of the first solution, the size of DCI 1_1 format may be reduced by excluding the common BWP related parameters or a new compact DCI format may be used for joint triggering of beam and BWP switch. In another implementation of the first solution, DCI format 1_0 may be used for such signaling by including BWP-Id or TCI-Id in the field item. In yet another implementation of the first solution, the UE neglects a BWP field in DCI 1_1.

In another implementation of the first solution, multiple BWPs are associated with one TCI state, as illustrated in Table 3. In this case, the BWP field in the DCI is used to switch both the beams as well as BWP. For example, according to Table 3, when the BWP indicated is 0 initially, and then switched to 1, then the "TCI state (beam) remains same. However, when the BWP switches from 1 to 2, then the TCI state (beam) is also updated from 0 to 1.

a beam index (i.e., TCI state) based on a configuration. In some embodiments of the first solution, a UE may determine which scheme is applied based on a configured/indicated table as explained above. For example, when multiple beams are associated with one BWP (such as in examples of Table 2a and Table 2b), a change of beam may implicitly indicate a change of an associated BWP. Conversely, if multiple BWPs are associated with one beam (such as in example of Table 3), a change of BWP may implicitly indicate a change of an associated beam.

According to embodiments of the second solution, simultaneous switching of multiple beams and BWPs and corresponding duration (after which the switching is done) is dynamically configured by the network through TCI in a single DCI. Such sort of switching is especially intended for earth-moving cells in LEO scenario where beams sweep across the covered area with the movement of the satellites along its orbit. Since the satellite speed and beam layout of the cell is already known to the network, the time duration of beam/BWP switching can be preconfigured. Based on this information, a mapping table is configured where the index indicates multiple TCI states with corresponding BWP-Id and duration for each of the TCI state and/or BWP. The sequence of beams/TCI states and BWP-Ids for specific durations may form a "switching pattern" where the UE automatically switches to a next beam and BWP after the indicated duration.

One example of such mapping information is shown in Table 4, where an index 0 in DCI indicates that a UE first applies TCI state 1 with BWP-Id 1 for 1 slot duration, then it switches to TCI state 2 with BWP-Id 2 for 2 slot durations, and then it follows TCI state 3 with BWP-Id 3 for 2 slot duration. Other index values in DCI indicate other switching patterns. Note that Table 4 assumes the case of FRF=3, e.g., similar to that depicted in FIG. 6A.

TABLE 4

| | An example of mapping table for multiple beams and BWP switching and corresponding duration | | |
|---|---|---|---|
| Index | | Mapping Information | |
| 0 | TCI state 1, 1 slot, BWP-1 | TCI state 2, 2 slots, BWP-2 | TCI state 3, 2 slots, BWP-3 |
| 1 | TCI state 5, 3 slots, BWP-2 | TCI state 4, 3 slots, BWP-1 | TCI state 1, 3 slots, BWP-3 |
| 2 | TCI state 4, 2 slots, BWP-2 | TCI state 7, 2 slots, BWP-3 | TCI state 3, 2 slots, BWP-1 |

TABLE 3

| Example of relationship between BWP-Id and TCI-states | |
|---|---|
| DL BWP-Id | TCI States |
| 0, 1 | 0 |
| 2, 3 | 1 |
| 4, 5 | 2 |

Since both implementations may be possible in an NTN, a UE may determine whether to determine a beam index (i.e., TCI state) based on a BWP or, conversely, a BWP by In one implementation, polarization information along with BWP-id and slot duration may also be added in the mapping table. Another example of mapping information is shown in Table 5, where an index 0 in DCI indicates that a UE first applies TCI state 1 with BWP-Id 1 and LHCP for 1 slot duration, then it switches to TCI state 2 with BWP-Id 2 and RHCP for 2 slot durations, and then it follows TCI state 3 with BWP-Id 3 and RHCP for 2 slot duration. Other index values in DCI indicate other switching patterns.

TABLE 5

An example of mapping table for multiple beams, polarization
type and BWP switching and corresponding duration

| Index | Mapping Information | | |
|---|---|---|---|
| 0 | TCI state 1, 1 slot, BWP-1, LHCP | TCI state 2, 2 slots, BWP-2, RHCP | TCI state 3, 2 slots, BWP-3, RHCP |
| 1 | TCI state 5, 3 slots, BWP-2, RHCP | TCI state 4, 3 slots, BWP-1, RHCP | TCI state 1, 3 slots, BWP-3, LHCP |
| 2 | TCI state 4, 2 slots, BWP-2, LHCP | TCI state 7, 2 slots, BWP-3, RHCP | TCI state 3, 2 slots, BWP-1, LHCP |

In practice, a beam dwelling time may last several seconds or several minutes depending on a beam-width, LEO satellite's velocity, and so on. Therefore, a configuration may determine a granularity (or unit) of beam switching times above. For example, a mapping similar to the above example may determine a dwelling time of N time units, wherein each time unit is indicated as M slots or M milliseconds by another configuration parameter.

Furthermore, depending on a UE's exact geographical location, the relative velocity may change at different rates. For example, at the nadir point of the satellite, the observed relative velocity may be higher than another point. Therefore, a location-related parameter may further be considered in combination with the mapping information. For example, in some embodiments of the second solution, the above mapping may be determined for a reference point, and a UE may need to adjust the dwelling times based on the location of the reference point and the location of the UE.

In an alternative embodiment of the second solution, BWP related parameters such as MCS and SCS are assumed to be same for all BWPs for a TCI-Id or for a group of TCI-Ids. In another implementation of the second solution, different parameters for BWPs can be configured for each TCI-Id or for a group of TCI-Ids. This information could be either included as part of the TCI table or some other field in the DCI or semi-statically configured by RRC.

In some embodiments of the second solution, the duration for which each of the TCI state/BWP Id is applicable is configured semi-statically. In one implementation of the second solution, a value of duration is configured for multiple or all the TCI states/BWP Ids. In some embodiments of the second solution, the switch from one TCI state/BWP-Id to another TCI state/BWP Id is triggered by MAC CE.

According to embodiments of the third solution, the network may configure a UE semi-statically by RRC with a BWP activity/switch timer on a serving cell. The granularity of the timer may be set according to subframe (e.g., 1 ms) or half-subframe (e.g., 0.5 ms) or slot duration. When the timer is running, the UE decrements the timer according to the granularity of the timer. The sequence of the BWP switch may vary for each user according to its location in the cell, its mobility, cell layout configuration, and satellite ephemeris. A UE will only start the BWP activity/switch timer of a serving cell, if configured, when it activates a DL BWP other than the default DL BWP.

FIG. 7A depicts one example of an enhanced Serving-CellConfig information element ("IE")—in Abstract Syntax Notation #1 ("ASN.1") form—for serving cell configuration with BWP activity/switch timer and corresponding sequence initialization. Entry 701 initializes the DL BWP switching sequence and also defines the BWP activity/switch timer.

FIG. 7B depicts another example of an enhanced Serv-ingCellConfig IE—in ASN.1 form—for serving cell configuration with BWP activity/switch timer and corresponding sequence initialization. In this example, entry 703 initializes the DL BWP switching sequence, while the granularity (unit) of the timer may be determined by the standard or by a configuration, e.g., at entry 705.

In one implementation of the third solution, a set of beam indices is also associated with BWP-Ids that are switched together according to BWP activity/switch timer. In another implementation of the third solution, consecutive beams within a BWP are switched by a DCI message while BWP activity/switch timer triggers beam switching and BWP switching only for those beams that have different BWPs. In yet another implementation of the third solution, beam switching follows BWP switching (or vice versa) according to a BWP-beam mapping as explained in the second solutions.

In alternative embodiment of the third solution, the activity/switch timer is updated or deactivated/(re)activated by a DCI message based on the UE's reported speed and/or heading, whether the UE is moving along or on the opposite direction of the beam movement.

In yet another embodiment of the third solution, the BWP/beam switching pattern and the associated dwelling times are indicated for a reference point. Then, a UE may make adjustments before applying the pattern and dwelling times based on the location of the reference point and the location of the UE.

According to embodiments of the fourth solution, a common BWP and beam switching is carried out for a set of UEs through a group-common DCI or through RRC. For earth-fixed cells, a beam changes with the satellite movement and this change is common for most of the UEs in the beam coverage area. For earth-moving cells, the UEs in the beam/cells would have a certain geographical scattering. In this case, UEs may be grouped based on the location information and satellite movement, where a common signaling framework may be applied to each group of UEs.

To avoid the signaling overhead, a new group-common DCI for signaling of BWP and beam switching may be used or alternatively one of the existing group-common DCI formats can be enhanced. An example of such DCI format is shown in Table 6. In one implementation of the fourth solution, the group-common DCI indicates a set of beams and/or BWP-Ids to be applied for a group of UEs that are configured to monitor this group-common DCI.

TABLE 6

Group-common DCI

| Field | Bits |
|---|---|
| Identifier for DCI formats | 0-N |
| Beam-Id | variable |
| BWP-Id | 0-M |

In another implementation of the fourth solution, multiple Beam Ids (such as TCI state Ids) may be indicated in the group-common DCI so that UEs in geographical boundaries of the beams may communicate through an alternative beam.

In some embodiments, group-common DCI is used to indicate only a common BWP Id and applied to a group of UEs. Corresponding beams associated to each of the BWP Id for each UE could be UE-specific that can be RRC configured. In one example implementation of the fourth solution, group-common DCI indicates common BWP Id 1 to a group of UEs that is configured to monitor this group-common DCI. Corresponding beam for BWP Id 1 is independently determined by each UE, for example, a first UE may have (UE-specific) TCI state 1 corresponding BWP Id 1, while a second UE may have (UE-specific) TCI state 4 corresponding BWP Id 1 and so on. The association of beam/TCI state to BWP Id can be either semi-statically configured by UE-specific RRC signaling or dynamically indicated by UE-specific DCI. In alternate embodiments, the Beam Id (TCI state) is indicated to a group of UEs by a group-common DCI and corresponding BWP Ids are separately determined by UEs based on RRC configuration or UE-specific DCI signaling. In some embodiments, the polarization type (either independently or along with BWP Id and/or beam (TCI state) is also indicated to a group of UEs via group-common DCI.

According to embodiments of the fifth solution, to avoid the latency, the UL BWP update indication is carried out significantly earlier than the uplink scheduling by DCI. In one implementation of the fifth solution, two separate fields in DCI format 1_1 may be used where one field is for DL BWP and another field is used for UL BWP. In another implementation of the fifth solution, a joint mapping table may be pre-configured where combinations of UL and DL BWPs are listed. One index field may be used in the DCI that indicates one of the combinations.

Figure 8:
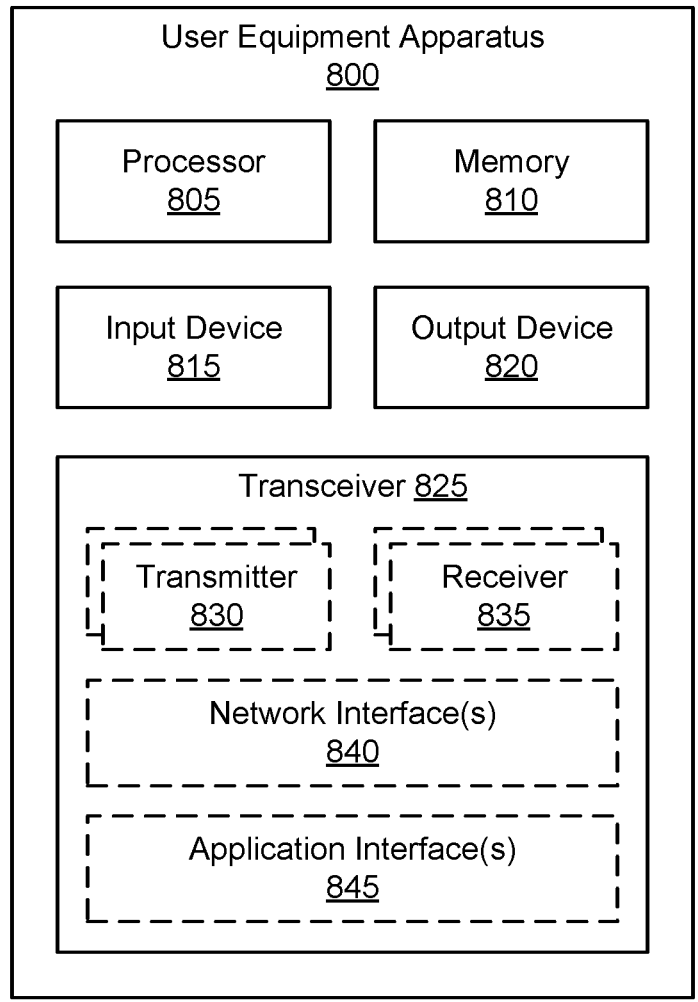
FIG. 8 is a block diagram illustrating one embodiment of a user equipment apparatus that may be used for BWP management and beam switching.

FIG. 8 depicts a user equipment apparatus 800 that may be used for BWP and beam switching, according to embodiments of the disclosure. In various embodiments, the user equipment apparatus 800 is used to implement one or more of the solutions described above. The user equipment apparatus 800 may be one embodiment of the remote unit 105, the UE 205, and/or the user equipment apparatus 800, described above. Furthermore, the user equipment apparatus 800 may include a processor 805, a memory 810, an input device 815, an output device 820, and a transceiver 825.

In some embodiments, the input device 815 and the output device 820 are combined into a single device, such as a touchscreen. In certain embodiments, the user equipment apparatus 800 may not include any input device 815 and/or output device 820. In various embodiments, the user equipment apparatus 800 may include one or more of: the processor 805, the memory 810, and the transceiver 825, and may not include the input device 815 and/or the output device 820.

As depicted, the transceiver 825 includes at least one transmitter 830 and at least one receiver 835. In some embodiments, the transceiver 825 communicates with one or more cells (or wireless coverage areas) supported by one or more base units 121. In various embodiments, the transceiver 825 is operable on unlicensed spectrum. Moreover, the transceiver 825 may include multiple UE panels supporting one or more beams. Additionally, the transceiver 825 may support at least one network interface 840 and/or application interface 845. The application interface(s) 845 may support one or more APIs. The network interface(s) 840 may support 3GPP reference points, such as Uu, N1, PCS, etc. Other network interfaces 840 may be supported, as understood by one of ordinary skill in the art.

The processor 805, in one embodiment, may include any known controller capable of executing computer-readable instructions and/or capable of performing logical operations. For example, the processor 805 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 805 executes instructions stored in the memory 810 to perform the methods and routines described herein. The processor 805 is communicatively coupled to the memory 810, the input device 815, the output device 820, and the transceiver 825.

In various embodiments, the processor 805 controls the user equipment apparatus 800 to implement the above described UE behaviors. In certain embodiments, the processor 805 may include an application processor (also known as "main processor") which manages application-domain and operating system ("OS") functions and a baseband processor (also known as "baseband radio processor") which manages radio functions.

In various embodiments, the processor 805 receives a first configuration via the transceiver 825, where the first configuration contains a mapping between a set of beams (i.e., single or multiple beams) and a set of BWPs (i.e., single or multiple BWPs) in a cell. The processor 805 jointly triggers beam and BWP switching based on a switching indication and according to the first configuration. Via the transceiver 825, the processor 805 communicates with a RAN using a new beam and a new BWP in response to the beam and BWP switching.

In some embodiments, the mapping between the set of beams and the set of BWPs contains a one-to-one mapping of BWP-Id to TCI state. In such embodiments, the switching indication that jointly triggers the beam and BWP switching includes a single field in DCI, said single field includes either a TCI field or a BWP index field. In some embodiments, a BWP-Id is associated to a set of TCI states. In such embodiments, the switching indication that jointly triggers the beam and BWP switching includes a TCI field in DCI.

In some embodiments, the mapping includes one or more of: polarization information for each beam, polarization information for each BWP, a set of BWP-Ids, a set of TCI states, a satellite ephemeris, and/or a slot duration for applying a TCI state and a corresponding BWP-Id, the slot duration defining a time until a subsequent beam and BWP switch. In certain embodiments, the mapping includes a pattern of joint beam and BWP switching, each element of the pattern containing a TCI state, a corresponding BWP-Id, and a slot duration.

In some embodiments, receiving the first configuration includes receiving an RRC configuration message (e.g., a RRC (Re)Config message) containing a list of configured TCI states in the cell for BWPs other than an active BWP. In some embodiments, the transceiver 825 further receives DCI containing a single bit field to indicate whether common parameters are to be used when switching between the set of BWPs, where a list of common parameters is defined in RRC signaling.

In some embodiments, the switching indication that jointly triggers the beam and BWP switching includes a MAC CE. In some embodiments, the transceiver 825 further receives DCI containing a first field for downlink BWP update and a second field for uplink BWP update. In some embodiments, the processor 805 further receives a semi-static configuration of a BWP activity/switch timer via RRC signaling. In such embodiments, the switching indication is the expiration of the BWP activity/switch timer.

In some embodiments, the first configuration includes a common configuration for a set of UEs. In such embodiments, the first configuration is received via a group-common DCI or through RRC. In certain embodiments, the group-common DCI indicates a set of beams and/or a set of BWP-Ids to be applied for a group of UEs that are configured to monitor the group-common DCI.

The memory 810, in one embodiment, is a computer readable storage medium. In some embodiments, the memory 810 includes volatile computer storage media. For example, the memory 810 may include a RAM, including dynamic RAM ("DRAM"), synchronous dynamic RAM ("SDRAM"), and/or static RAM ("SRAM"). In some embodiments, the memory 810 includes non-volatile computer storage media. For example, the memory 810 may include a hard disk drive, a flash memory, or any other suitable non-volatile computer storage device. In some embodiments, the memory 810 includes both volatile and non-volatile computer storage media.

In some embodiments, the memory 810 stores data related to BWP and beam switching. For example, the memory 810 may store various parameters, panel/beam configurations, resource assignments, policies, and the like as described above. In certain embodiments, the memory 810 also stores program code and related data, such as an operating system or other controller algorithms operating on the apparatus 800.

The input device 815, in one embodiment, may include any known computer input device including a touch panel, a button, a keyboard, a stylus, a microphone, or the like. In some embodiments, the input device 815 may be integrated with the output device 820, for example, as a touchscreen or similar touch-sensitive display. In some embodiments, the input device 815 includes a touchscreen such that text may be input using a virtual keyboard displayed on the touchscreen and/or by handwriting on the touchscreen. In some embodiments, the input device 815 includes two or more different devices, such as a keyboard and a touch panel.

The output device 820, in one embodiment, is designed to output visual, audible, and/or haptic signals. In some embodiments, the output device 820 includes an electronically controllable display or display device capable of outputting visual data to a user. For example, the output device 820 may include, but is not limited to, a Liquid Crystal Display ("LCD"), a Light-Emitting Diode ("LED") display, an Organic LED ("OLED") display, a projector, or similar display device capable of outputting images, text, or the like to a user. As another, non-limiting, example, the output device 820 may include a wearable display separate from, but communicatively coupled to, the rest of the user equipment apparatus 800, such as a smart watch, smart glasses, a heads-up display, or the like. Further, the output device 820 may be a component of a smart phone, a personal digital assistant, a television, a table computer, a notebook (laptop) computer, a personal computer, a vehicle dashboard, or the like.

In certain embodiments, the output device 820 includes one or more speakers for producing sound. For example, the output device 820 may produce an audible alert or notification (e.g., a beep or chime). In some embodiments, the output device 820 includes one or more haptic devices for producing vibrations, motion, or other haptic feedback. In some embodiments, all or portions of the output device 820 may be integrated with the input device 815. For example, the input device 815 and output device 820 may form a touchscreen or similar touch-sensitive display. In other embodiments, the output device 820 may be located near the input device 815.

The transceiver 825 communicates with one or more network functions of a mobile communication network via one or more access networks. The transceiver 825 operates under the control of the processor 805 to transmit messages, data, and other signals and also to receive messages, data, and other signals. For example, the processor 805 may selectively activate the transceiver 825 (or portions thereof) at particular times in order to send and receive messages.

The transceiver 825 includes at least transmitter 830 and at least one receiver 835. One or more transmitters 830 may be used to provide UL communication signals to a base unit 121, such as the UL transmissions described herein. Similarly, one or more receivers 835 may be used to receive DL communication signals from the base unit 121, as described herein. Although only one transmitter 830 and one receiver 835 are illustrated, the user equipment apparatus 800 may have any suitable number of transmitters 830 and receivers 835. Further, the transmitter(s) 830 and the receiver(s) 835 may be any suitable type of transmitters and receivers. In one embodiment, the transceiver 825 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 825, transmitters 830, and receivers 835 may be implemented as physically separate components that access a shared hardware resource and/or software resource, such as for example, the network interface 840.

In various embodiments, one or more transmitters 830 and/or one or more receivers 835 may be implemented and/or integrated into a single hardware component, such as a multi-transceiver chip, a system-on-a-chip, an Application-Specific Integrated Circuit ("ASIC"), or other type of hardware component. In certain embodiments, one or more transmitters 830 and/or one or more receivers 835 may be implemented and/or integrated into a multi-chip module. In some embodiments, other components such as the network interface 840 or other hardware components/circuits may be integrated with any number of transmitters 830 and/or receivers 835 into a single chip. In such embodiment, the transmitters 830 and receivers 835 may be logically configured as a transceiver 825 that uses one more common control signals or as modular transmitters 830 and receivers 835 implemented in the same hardware chip or in a multi-chip module.

Figure 9:
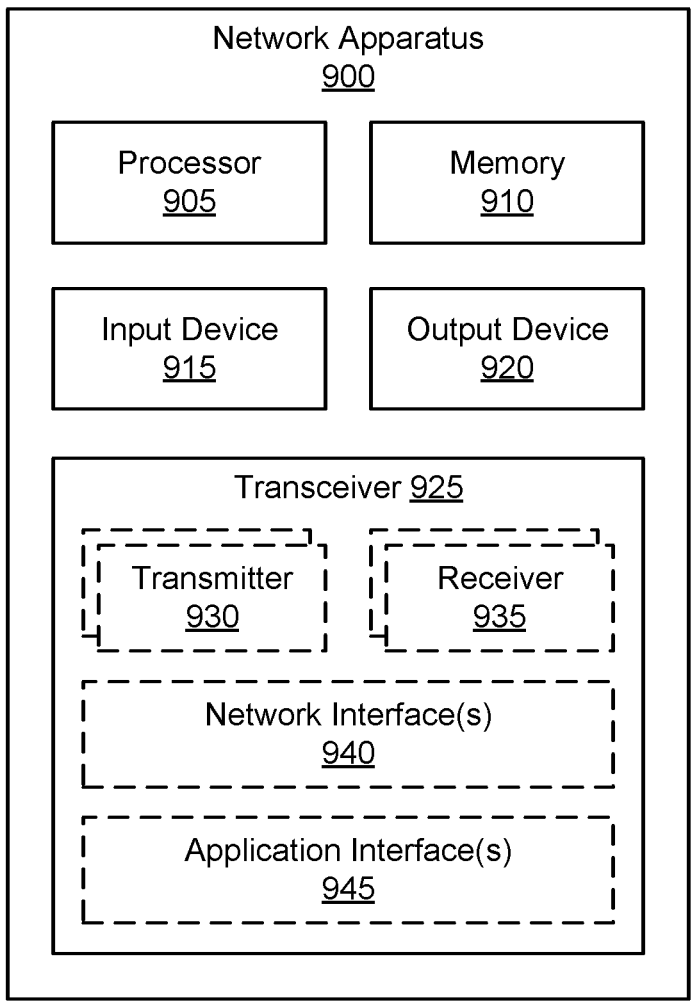
FIG. 9 is a block diagram illustrating one embodiment of a network apparatus that may be used for BWP management and beam switching.

FIG. 9 depicts a network apparatus 900 that may be used for BWP and beam switching, according to embodiments of the disclosure. In one embodiment, network apparatus 900 may be one implementation of a RAN device, such as the base unit 121, as described above. Furthermore, the network apparatus 900 may include a processor 905, a memory 910, an input device 915, an output device 920, and a transceiver 925.

In some embodiments, the input device 915 and the output device 920 are combined into a single device, such as a touchscreen. In certain embodiments, the network apparatus 900 may not include any input device 915 and/or output device 920. In various embodiments, the network apparatus 900 may include one or more of: the processor 905, the memory 910, and the transceiver 925, and may not include the input device 915 and/or the output device 920.

As depicted, the transceiver 925 includes at least one transmitter 930 and at least one receiver 935. Here, the transceiver 925 communicates with one or more remote units 105. Additionally, the transceiver 925 may support at least one network interface 940 and/or application interface 945. The application interface(s) 945 may support one or more APIs. The network interface(s) 940 may support 3GPP reference points, such as Uu, N1, N2 and N3. Other network interfaces 940 may be supported, as understood by one of ordinary skill in the art.

The processor 905, in one embodiment, may include any known controller capable of executing computer-readable instructions and/or capable of performing logical operations. For example, the processor 905 may be a microcontroller, a microprocessor, a CPU, a GPU, an auxiliary processing unit, a FPGA, or similar programmable controller. In some embodiments, the processor 905 executes instructions stored in the memory 910 to perform the methods and routines described herein. The processor 905 is communicatively coupled to the memory 910, the input device 915, the output device 920, and the transceiver 925.

In various embodiments, the network apparatus 900 is a RAN node (e.g., gNB) that communicates with one or more UEs, as described herein. In such embodiments, the processor 905 controls the network apparatus 900 to perform the above described RAN behaviors. When operating as a RAN node, the processor 905 may include an application processor (also known as "main processor") which manages application-domain and operating system ("OS") functions and a baseband processor (also known as "baseband radio processor") which manages radio functions.

In various embodiments, the processor 905 creates a first configuration containing a mapping between a set of beams (i.e., single or multiple beams) and a set of BWPs (i.e., single or multiple BWPs) in a cell and, via the transceiver 925, configures at least one UE with the first configuration. Via the transceiver 925, the processor 905 jointly triggers beam and BWP switching at a UE according to the first configuration and communicates with the UE using a new beam and a new BWP in response to triggering the beam and BWP switching.

In some embodiments, the mapping between the set of beams and the set of BWPs contains a one-to-one mapping of BWP-Id to TCI state. In such embodiments, the switching indication that jointly triggers the beam and BWP switching includes a single field in DCI, said single field containing one of either a TCI field or a BWP index field. In some embodiments, a BWP-Id is associated to a set of TCI states. In such embodiments, the switching indication that jointly triggers the beam and BWP switching includes a TCI field in DCI.

In some embodiments, the mapping includes one or more of: polarization information for each beam, polarization information for each BWP, a set of BWP-Ids, a set of TCI states, a satellite ephemeris, and/or a slot duration for applying a TCI state and a corresponding BWP-Id, the slot duration defining a time until a subsequent beam and BWP switch. In certain embodiments, the mapping includes a pattern of joint beam and BWP switching, each element of the pattern containing a TCI state, a corresponding BWP-Id, and a slot duration.

In some embodiments, sending the first configuration includes sending an RRC configuration message (e.g., a RRC (Re)Config message) containing a list of configured TCI states in the cell for BWPs other than an active BWP. In some embodiments, the transceiver 925 further transmits DCI containing a single bit field to indicate whether common parameters are to be used when switching between the set of BWPs, where a list of common parameters is defined in RRC signaling.

In some embodiments, the switching indication that jointly triggers the beam and BWP switching includes a MAC CE. In some embodiments, the transceiver 925 further transmits DCI containing a first field for downlink BWP update and a second field for uplink BWP update. In some embodiments, the transceiver 925 further sends a semi-static configuration of a BWP activity/switch timer via RRC signaling. In such embodiments, the switching indication is the expiration of the BWP activity/switch timer.

In some embodiments, the first configuration includes a common configuration for a set of UEs. In such embodiments, the first configuration is transmitted via a group-common DCI or via RRC signaling. In certain embodiments, the group-common DCI indicates a set of beams and/or a set of BWP-Ids to be applied for a group of UEs that are configured to monitor the group-common DCI.

The memory 910, in one embodiment, is a computer readable storage medium. In some embodiments, the memory 910 includes volatile computer storage media. For example, the memory 910 may include a RAM, including dynamic RAM ("DRAM"), synchronous dynamic RAM ("SDRAM"), and/or static RAM ("SRAM"). In some embodiments, the memory 910 includes non-volatile computer storage media. For example, the memory 910 may include a hard disk drive, a flash memory, or any other suitable non-volatile computer storage device. In some embodiments, the memory 910 includes both volatile and non-volatile computer storage media.

In some embodiments, the memory 910 stores data related to BWP and beam switching. For example, the memory 910 may store parameters, configurations, resource assignments, policies, and the like, as described above. In certain embodiments, the memory 910 also stores program code and related data, such as an operating system or other controller algorithms operating on the apparatus 900.

The input device 915, in one embodiment, may include any known computer input device including a touch panel, a button, a keyboard, a stylus, a microphone, or the like. In some embodiments, the input device 915 may be integrated with the output device 920, for example, as a touchscreen or similar touch-sensitive display. In some embodiments, the input device 915 includes a touchscreen such that text may be input using a virtual keyboard displayed on the touchscreen and/or by handwriting on the touchscreen. In some embodiments, the input device 915 includes two or more different devices, such as a keyboard and a touch panel.

The output device 920, in one embodiment, is designed to output visual, audible, and/or haptic signals. In some embodiments, the output device 920 includes an electronically controllable display or display device capable of outputting visual data to a user. For example, the output device 920 may include, but is not limited to, an LCD display, an LED display, an OLED display, a projector, or similar display device capable of outputting images, text, or the like to a user. As another, non-limiting, example, the output device 920 may include a wearable display separate from, but communicatively coupled to, the rest of the network apparatus 900, such as a smart watch, smart glasses, a heads-up display, or the like. Further, the output device 920 may be a component of a smart phone, a personal digital assistant, a television, a table computer, a notebook (laptop) computer, a personal computer, a vehicle dashboard, or the like.

In certain embodiments, the output device 920 includes one or more speakers for producing sound. For example, the output device 920 may produce an audible alert or notification (e.g., a beep or chime). In some embodiments, the output device 920 includes one or more haptic devices for producing vibrations, motion, or other haptic feedback. In some embodiments, all or portions of the output device 920 may be integrated with the input device 915. For example, the input device 915 and output device 920 may form a touchscreen or similar touch-sensitive display. In other embodiments, the output device 920 may be located near the input device 915.

The transceiver 925 includes at least transmitter 930 and at least one receiver 935. One or more transmitters 930 may be used to communicate with the UE, as described herein. Similarly, one or more receivers 935 may be used to communicate with network functions in the Public Land Mobile Network ("PLMN") and/or RAN, as described herein. Although only one transmitter 930 and one receiver 935 are illustrated, the network apparatus 900 may have any suitable number of transmitters 930 and receivers 935. Further, the transmitter(s) 930 and the receiver(s) 935 may be any suitable type of transmitters and receivers.

FIG. 10 depicts one embodiment of a method 1000 for BWP and beam switching, according to embodiments of the disclosure. In various embodiments, the method 1000 is performed by a UE device, such as the remote unit 105, the UE 205, and/or the user equipment apparatus 800, described above as described above. In some embodiments, the method 1000 is performed by a processor, such as a microcontroller, a microprocessor, a CPU, a GPU, an auxiliary processing unit, a FPGA, or the like.

The method 1000 begins and receives 1005 a first configuration from a RAN, the first configuration containing a mapping between a set of one or more beams in a cell and a set of one or more BWPs in the cell. The method 1000 includes jointly triggering 1010 beam and BWP switching based on a switching indication and according to the first configuration. The method 1000 includes communicating 1015 with the RAN using a new beam and a new BWP in response to the beam and BWP switching. The method 1000 ends.

Figure 11:
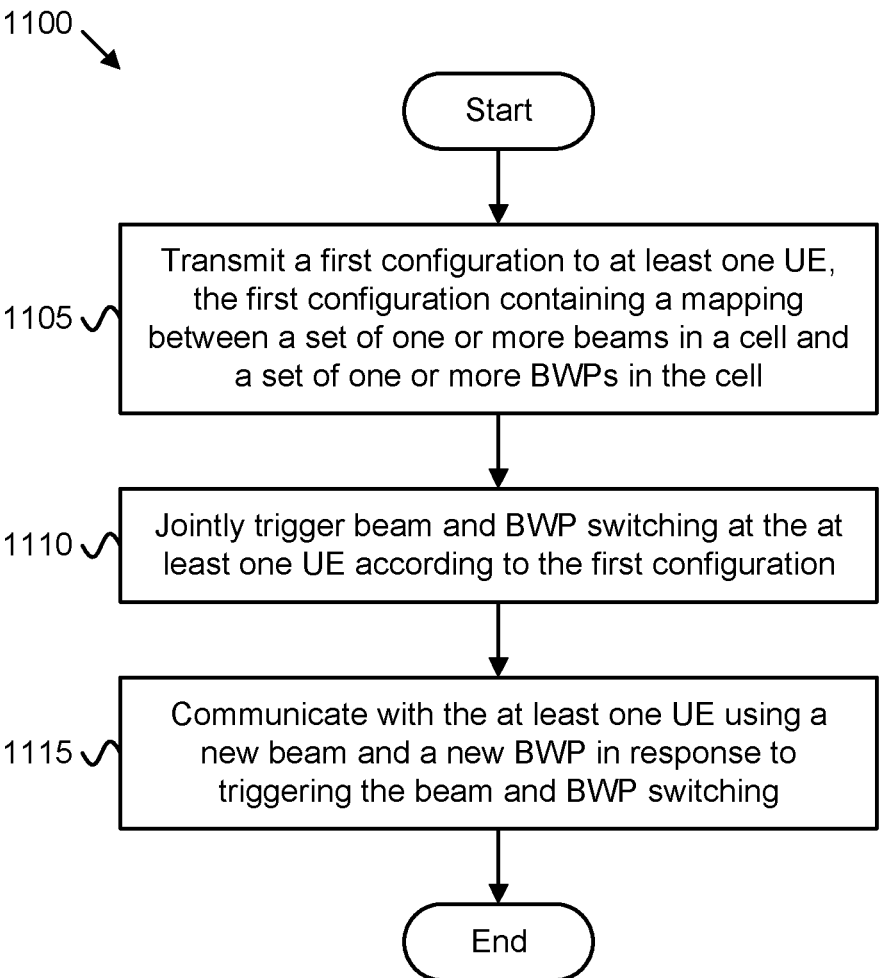
FIG. 11 is a flowchart diagram illustrating one embodiment of a second method for BWP management and beam switching.

FIG. 11 depicts one embodiment of a method 1100 for BWP and beam switching, according to embodiments of the disclosure. In various embodiments, the method 1100 is performed by a network entity, such as the base unit 121, the RAN node 305, and/or the network apparatus 900, described above as described above. In some embodiments, the method 1100 is performed by a processor, such as a microcontroller, a microprocessor, a CPU, a GPU, an auxiliary processing unit, a FPGA, or the like.

The method 1100 begins and transmits 1105 a first configuration to at least one UE, the first configuration containing a mapping between a set of one or more beams in a cell and a set of one or more BWPs in the cell. The method 1100 includes jointly triggering 1110 beam and BWP switching at the at least one UE according to the first configuration. The method 1100 includes communicating 1115 with the at least one UE using a new beam and a new BWP in response to triggering the beam and BWP switching. The method 1100 ends.

Disclosed herein is a first apparatus for BWP and beam switching, according to embodiments of the disclosure. The first apparatus may be implemented by a UE device, such as the remote unit 105, the UE 205, and/or the user equipment apparatus 800, described above. The first apparatus includes a transceiver and a processor that receives a first configuration, where the first configuration contains a mapping between a set of beams (i.e., single or multiple beams) and a set of BWPs (i.e., single or multiple BWPs) in a cell. The processor jointly triggers beam and BWP switching based on a switching indication and according to the first configuration and communicates, via the transceiver, with a RAN using a new beam and a new BWP in response to the beam and BWP switching.

In some embodiments, the mapping between the set of beams and the set of BWPs contains a one-to-one mapping of BWP-Id to TCI state. In such embodiments, the switching indication that jointly triggers the beam and BWP switching includes a single field in DCI, said single field includes either a TCI field or a BWP index field.

In some embodiments, a BWP-Id is associated to a set of TCI states. In such embodiments, the switching indication that jointly triggers the beam and BWP switching includes a TCI field in DCI.

In some embodiments, the mapping includes one or more of: polarization information for each beam, polarization information for each BWP, a set of BWP-Ids, a set of TCI states, a satellite ephemeris, and/or a slot duration for applying a TCI state and a corresponding BWP-Id, the slot duration defining a time until a subsequent beam and BWP switch. In certain embodiments, the mapping includes a pattern of joint beam and BWP switching, each element of the pattern containing a TCI state, a corresponding BWP-Id, and a slot duration.

In some embodiments, receiving the first configuration includes receiving an RRC configuration message (e.g., a RRC (Re) Config message) containing a list of configured TCI states in the cell for BWPs other than an active BWP.

In some embodiments, the transceiver further receives DCI containing a single bit field to indicate whether common parameters are to be used when switching between the set of BWPs, where a list of common parameters is defined in RRC signaling.

In some embodiments, the switching indication that jointly triggers the beam and BWP switching includes a MAC CE. In some embodiments, the transceiver further receives DCI containing a first field for downlink BWP update and a second field for uplink BWP update.

In some embodiments, the processor further receives a semi-static configuration of a BWP activity/switch timer via RRC signaling. In such embodiments, the switching indication is the expiration of the BWP activity/switch timer.

In some embodiments, the first configuration includes a common configuration for a set of UEs. In such embodiments, the first configuration is received via a group-common DCI or through RRC. In certain embodiments, the group-common DCI indicates a set of beams and/or a set of BWP-Ids to be applied for a group of UEs that are configured to monitor the group-common DCI.

Disclosed herein is a first method for BWP and beam switching, according to embodiments of the disclosure. The first method may be performed by a UE device, such as the remote unit 105, the UE 205, and/or the user equipment apparatus 800, described above. The first method includes receiving a first configuration, where the first configuration contains a mapping between a set of beams (i.e., single or multiple beams) and a set of BWPs (i.e., single or multiple BWPs) in a cell. The first method includes jointly triggering beam and BWP switching based on a switching indication and according to the first configuration and communicating with a RAN using a new beam and a new BWP in response to the beam and BWP switching.

In some embodiments, the mapping between the set of beams and the set of BWPs contains a one-to-one mapping of BWP-Id to TCI state. In such embodiments, the switching indication that jointly triggers the beam and BWP switching includes a single field in DCI, said single field includes either a TCI field or a BWP index field.

In some embodiments, a BWP-Id is associated to a set of TCI states. In such embodiments, the switching indication that jointly triggers the beam and BWP switching includes a TCI field in DCI.

In some embodiments, the mapping includes one or more of: polarization information for each beam, polarization information for each BWP, a set of BWP-Ids, a set of TCI states, a satellite ephemeris, and/or a slot duration for applying a TCI state and a corresponding BWP-Id, the slot duration defining a time until a subsequent beam and BWP switch. In certain embodiments, the mapping includes a pattern of joint beam and BWP switching, each element of the pattern containing a TCI state, a corresponding BWP-Id, and a slot duration.

In some embodiments, receiving the first configuration includes receiving an RRC configuration message (e.g., a RRC (Re) Config message) containing a list of configured TCI states in the cell for BWPs other than an active BWP.

In some embodiments, the first method further includes receiving DCI containing a single bit field to indicate whether common parameters are to be used when switching between the set of BWPs, where a list of common parameters is defined in RRC signaling.

In some embodiments, the switching indication that jointly triggers the beam and BWP switching includes a MAC CE. In some embodiments, the first method further includes receiving DCI containing a first field for downlink BWP update and a second field for uplink BWP update.

In some embodiments, the first method further includes receiving a semi-static configuration of a BWP activity/switch timer via RRC signaling. In such embodiments, the switching indication is the expiration of the BWP activity/switch timer.

In some embodiments, the first configuration includes a common configuration for a set of UEs. In such embodiments, the first configuration is received via a group-common DCI or through RRC. In certain embodiments, the group-common DCI indicates a set of beams and/or a set of BWP-Ids to be applied for a group of UEs that are configured to monitor the group-common DCI.

Disclosed herein is a second apparatus for BWP and beam switching, according to embodiments of the disclosure. The second apparatus may be implemented by a network entity, such as the base unit 121, the RAN node 305, and/or the network apparatus 900, described above. The second apparatus includes a transceiver and a processor that creates a first configuration containing a mapping between a set of beams (i.e., single or multiple beams) and a set of BWPs (i.e., single or multiple BWPs) in a cell. The transceiver sends the first configuration to at least one UE. Via the transceiver, the processor jointly triggers beam and BWP switching at the at least one UE according to the first configuration and communicates with the at least one UE using a new beam and a new BWP in response to triggering the beam and BWP switching.

In some embodiments, the mapping between the set of beams and the set of BWPs contains a one-to-one mapping of BWP-Id to TCI state. In such embodiments, the switching indication that jointly triggers the beam and BWP switching includes a single field in DCI, said single field containing one of either a TCI field or a BWP index field.

In some embodiments, a BWP-Id is associated to a set of TCI states. In such embodiments, the switching indication that jointly triggers the beam and BWP switching includes a TCI field in DCI.

In some embodiments, the mapping includes one or more of: polarization information for each beam, polarization information for each BWP, a set of BWP-Ids, a set of TCI states, a satellite ephemeris, and/or a slot duration for applying a TCI state and a corresponding BWP-Id, the slot duration defining a time until a subsequent beam and BWP switch. In certain embodiments, the mapping includes a pattern of joint beam and BWP switching, each element of the pattern containing a TCI state, a corresponding BWP-Id, and a slot duration.

In some embodiments, sending the first configuration includes sending an RRC configuration message (i.e., a RRC (Re) Config message) containing a list of configured TCI states in the cell for BWPs other than an active BWP.

In some embodiments, the transceiver further transmits DCI containing a single bit field to indicate whether common parameters are to be used when switching between the set of BWPs, where a list of common parameters is defined in RRC signaling.

In some embodiments, the switching indication that jointly triggers the beam and BWP switching includes a MAC CE. In some embodiments, the transceiver further transmits DCI containing a first field for downlink BWP update and a second field for uplink BWP update.

In some embodiments, the transceiver further sends a semi-static configuration of a BWP activity/switch timer via RRC signaling. In such embodiments, the switching indication is the expiration of the BWP activity/switch timer.

In some embodiments, the first configuration includes a common configuration for a set of UEs. In such embodiments, the first configuration is transmitted via a group-common DCI or via RRC signaling. In certain embodiments, the group-common DCI indicates a set of beams and/or a set of BWP-Ids to be applied for a group of UEs that are configured to monitor the group-common DCI.

Disclosed herein is a second method for BWP and beam switching, according to embodiments of the disclosure. The second method may be performed by a network entity, such as the base unit 121, the RAN node 305, and/or the network apparatus 900, described above. The second method includes transmitting a first configuration to at least one UE, the first configuration containing a mapping between a set of beams (i.e., single or multiple beams) and a set of BWPs (i.e., single or multiple BWPs) in a cell. The second method includes jointly triggering beam and BWP switching at the at least one UE according to the first configuration and communicating with the at least one UE using a new beam and a new BWP in response to triggering the beam and BWP switching.

In some embodiments, the mapping between the set of beams and the set of BWPs contains a one-to-one mapping of BWP-Id to TCI state. In such embodiments, the switching indication that jointly triggers the beam and BWP switching includes a single field in DCI, said single field containing one of either a TCI field or a BWP index field.

In some embodiments, a BWP-Id is associated to a set of TCI states. In such embodiments, the switching indication that jointly triggers the beam and BWP switching includes a TCI field in DCI.

In some embodiments, the mapping includes one or more of: polarization information for each beam, polarization information for each BWP, a set of BWP-Ids, a set of TCI states, a satellite ephemeris, and/or a slot duration for applying a TCI state and a corresponding BWP-Id, the slot duration defining a time until a subsequent beam and BWP switch. In certain embodiments, the mapping includes a pattern of joint beam and BWP switching, each element of the pattern containing a TCI state, a corresponding BWP-Id, and a slot duration.

In some embodiments, sending the first configuration includes sending an RRC configuration message (i.e., a RRC (Re) Config message) containing a list of configured TCI states in the cell for BWPs other than an active BWP.

In some embodiments, the second method further includes transmitting DCI containing a single bit field to indicate whether common parameters are to be used when switching between the set of BWPs, where a list of common parameters is defined in RRC signaling.

In some embodiments, the switching indication that jointly triggers the beam and BWP switching includes a MAC CE. In some embodiments, the second method further includes transmitting DCI containing a first field for downlink BWP update and a second field for uplink BWP update.

In some embodiments, the second method further includes sending a semi-static configuration of a BWP activity/switch timer via RRC signaling. In such embodiments, the switching indication is the expiration of the BWP activity/switch timer.

In some embodiments, the first configuration includes a common configuration for a set of UEs. In such embodiments, the first configuration is transmitted via a group-common DCI or via RRC signaling. In certain embodiments, the group-common DCI indicates a set of beams and/or a set of BWP-Ids to be applied for a group of UEs that are configured to monitor the group-common DCI.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE) for wireless communication comprising:
at least one memory; and
at least one processor coupled with the at least one memory and configured to cause the UE to:
receive a first configuration that indicates a mapping between a set of beams and a set of bandwidth parts (BWPs), wherein the first configuration indicates a beam switching pattern and a BWP switching pattern and the mapping comprises a one-to-one mapping between a transmission configuration indicator (TCI) state and a BWP identifier (BWP-ID);
trigger a beam switching and a BWP switching based on an indication and according to the first configuration, wherein the indication comprises a field in a downlink control information (DCI), and wherein the field comprises one of a TCI field or a BWP index field; and communicate with a radio access network (RAN) using a beam and a BWP associated with the beam switching and the BWP switching.

2. The UE of claim 1, wherein the mapping comprises at least one of: polarization information for each beam, polarization information for each BWP, a satellite ephemeris, a slot duration for applying a TCI state and a corresponding BWP-ID, or a combination thereof.

3. The UE of claim 1, wherein the mapping comprises an element pattern of joint beam and BWP switching associated with the beam switching pattern and the BWP switching pattern, wherein each element of the element pattern comprises a TCI state, a corresponding BWP-ID, and a slot duration.

4. The UE of claim 1, wherein to receive the first configuration, the at least one processor is configured to cause the UE to receive a radio resource control (RRC) configuration message comprising a list of configured TCI states associated with BWPs other than an active BWP.

5. The UE of claim 1, wherein DCI comprises a single bit field to indicate whether to use common parameters when switching between the set of BWPs, and wherein a list of common parameters is defined in radio resource control (RRC) signaling.

6. The UE of claim 1, wherein the at least one processor is further configured to cause the UE to receive a semi-static configuration of a BWP timer, and wherein the indication further indicates an expiration of the BWP timer.

7. The UE of claim 1, wherein the first configuration comprises a common configuration for a set of UEs, and wherein the indication comprises a group-common DCI.

8. The UE of claim 7, wherein the group-common DCI indicates the set of beams or a set of BWP-IDs, or both, for a group of UEs that are configured to monitor the group-common DCI.

9. The UE of claim 1, wherein the DCI comprises a first field to indicate a downlink BWP update and a second field to indicate an uplink BWP update.

10. A processor for wireless communication, comprising:
at least one controller coupled with at least one memory and configured to cause the processor to:
receive a first configuration that indicates a mapping between a set of beams and a set of bandwidth parts (BWPs) in a cell, wherein the first configuration indicates a beam switching pattern and a BWP switching pattern and the mapping comprises a one-to-one mapping between a transmission configuration indicator (TCI) state and a BWP identifier (BWP-ID);
trigger a beam switching and a BWP switching based on an indication and according to the first configuration, wherein the indication comprises a field in a downlink control information (DCI), and wherein the field comprises one of a TCI field or a BWP index field; and
communicate with a radio access network (RAN) using a beam and a BWP associated with the beam switching and the BWP switching.

11. A base station for wireless communication, comprising:
at least one memory; and
at least one processor coupled with the at least one memory and configured to cause the base station to:
create a first configuration that indicates a mapping between a set of beams and a set of bandwidth parts (BWPs), wherein the first configuration indicates a beam switching pattern and a BWP switching pattern and the mapping comprises a one-to-one mapping between a transmission configuration indicator (TCI) state and a BWP identifier (BWP-ID);

transmit the first configuration and an indication comprising a field in a downlink control information (DCI) to at least one user equipment (UE), wherein the field comprises one of a TCI field or a BWP index field;

trigger a beam switching and a BWP switching at the at least one UE according to the indication and the first configuration; and communicate with the at least one UE using a beam and a BWP associated with the beam switching and the BWP switching.

12. The base station of claim 11, wherein to trigger the beam switching and the BWP switching, the at least one processor is configured to cause the base station to transmit the indication to the at least one UE.

13. The base station of claim 11, wherein the mapping comprises at least one of: polarization information for each beam, polarization information for each BWP, a satellite ephemeris, a slot duration for applying a TCI state and a corresponding BWP-ID, or a combination thereof.

14. A method performed by a base station, the method comprising:

creating a first configuration that indicates a mapping between a set of beams and a set of bandwidth parts (BWPs), wherein the first configuration indicates a beam switching pattern and a BWP switching pattern and the mapping comprises a one-to-one mapping between a transmission configuration indicator (TCI) state and a BWP identifier (BWP-ID);

transmitting the first configuration and an indication comprising a field in a downlink control information (DCI) to at least one user equipment (UE), wherein the field comprises one of a TCI field or a BWP index field;

triggering a beam switching and a BWP switching at the at least one UE according to the first configuration; and communicating with the at least one UE using a beam and a BWP associated with the beam switching and the BWP switching.

15. The base station of claim 11, wherein the first configuration comprises a common configuration for a set of UEs, and wherein the indication comprises a group-common DCI.

16. The base station of claim 11, wherein the mapping comprises an element pattern of joint beam and BWP switching associated with the beam switching pattern and the BWP switching pattern, wherein each element of the element pattern comprises a TCI state, a corresponding BWP-ID, and a slot duration.

17. The base station of claim 15, wherein the group-common DCI indicates the set of beams or a set of BWP-IDs, or both, for a group of UEs that are configured to monitor the group-common DCI.

18. The base station of claim 11, wherein to transmit the first configuration, the at least one processor is configured to cause the base station to transmit a radio resource control (RRC) configuration message comprising a list of configured TCI states associated with BWPs other than an active BWP.

19. The base station of claim 11, wherein the DCI comprises a single bit field to indicate whether to use common parameters when switching between the set of BWPs, and wherein a list of common parameters is defined in radio resource control (RRC) signaling.

20. The base station of claim 11, wherein the DCI comprises a first field to indicate a downlink BWP update and a second field to indicate an uplink BWP update.

* * * * *